(12) United States Patent
Yamazaki

(10) Patent No.: US 10,007,299 B2
(45) Date of Patent: Jun. 26, 2018

(54) DISPLAY DEVICE AND DATA PROCESSING DEVICE

(71) Applicant: Semiconductor Energy Laboratory Co., LTD., Atsugi-shi, Kanagawa-ken (JP)

(72) Inventor: Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 112 days.

(21) Appl. No.: 14/640,117

(22) Filed: Mar. 6, 2015

(65) Prior Publication Data

US 2015/0261257 A1    Sep. 17, 2015

(30) Foreign Application Priority Data

Mar. 12, 2014    (JP) ................. 2014-048381

(51) Int. Cl.
| | | |
|---|---|---|
| *G06F 1/16* | (2006.01) | |
| *G09G 5/14* | (2006.01) | |
| *G06F 3/14* | (2006.01) | |
| *G09G 5/00* | (2006.01) | |

(52) U.S. Cl.
CPC .......... *G06F 1/1641* (2013.01); *G06F 1/1677* (2013.01); *G06F 3/1431* (2013.01); *G09G 5/14* (2013.01); *G09G 5/003* (2013.01); *G09G 2320/08* (2013.01); *G09G 2354/00* (2013.01); *G09G 2356/00* (2013.01); *G09G 2370/22* (2013.01); *G09G 2380/02* (2013.01)

(58) Field of Classification Search
CPC .... G06F 1/1641; G06F 1/1677; G06F 3/1431; G09G 5/14; G09G 2356/00; G09G 2380/02; G09G 2370/22; G09G 5/003; G09G 2320/08; G09G 2354/00
USPC ......................................................... 345/520
See application file for complete search history.

(56) References Cited

U.S. PATENT DOCUMENTS

| | | |
|---|---|---|
| 6,262,785 B1 | 7/2001 | Kim |
| 7,301,171 B2 | 11/2007 | Osame et al. |
| 7,327,335 B2 | 2/2008 | Yamazaki et al. |
| 7,609,310 B2 | 10/2009 | Miyagawa |
| 8,319,725 B2 | 11/2012 | Okamoto et al. |
| 8,953,120 B2 | 2/2015 | Yamazaki et al. |
| 2006/0050169 A1 | 3/2006 | Misawa |

(Continued)

FOREIGN PATENT DOCUMENTS

| | | |
|---|---|---|
| JP | 2001-255513 | 9/2001 |
| JP | 2001-255514 | 9/2001 |
| JP | 2012-190794 | 10/2012 |

*Primary Examiner* — Ke Xiao
*Assistant Examiner* — Kim-Thanh T Tran
(74) *Attorney, Agent, or Firm* — Nixon Peabody LLP; Jeffrey L. Costellia

(57) ABSTRACT

A novel display panel that is highly convenient or reliable is provided. A novel data processing device that is highly convenient or reliable is provided. A novel human interface that is highly convenient or reliable is provided. A display device includes a display region in which a first region, a first bendable region, and a second region are arranged. The display device can be folded along a fold line formed in the first bendable region. An object behind the display device is visible through the first region, the first bendable region, and the second region. Other embodiments are also claimed.

10 Claims, 14 Drawing Sheets

(56) References Cited

U.S. PATENT DOCUMENTS

| | | | |
|---|---|---|---|
| 2006/0121940 A1* | 6/2006 | Kong | G03B 21/06 |
| | | | 455/557 |
| 2010/0201603 A1* | 8/2010 | Kee | H04N 9/12 |
| | | | 345/1.3 |
| 2011/0124376 A1* | 5/2011 | Kim | G06F 1/1626 |
| | | | 455/566 |
| 2011/0126141 A1* | 5/2011 | King | G06F 1/1616 |
| | | | 715/769 |
| 2012/0176570 A1 | 7/2012 | Yamazaki et al. | |
| 2012/0217516 A1 | 8/2012 | Hatano et al. | |
| 2013/0100392 A1 | 4/2013 | Fukushima | |
| 2013/0113843 A1 | 5/2013 | Yamazaki | |
| 2014/0049449 A1* | 2/2014 | Park | G09G 5/00 |
| | | | 345/1.3 |
| 2014/0306260 A1 | 10/2014 | Yamazaki et al. | |
| 2014/0361980 A1 | 12/2014 | Iwaki et al. | |
| 2015/0062525 A1 | 3/2015 | Hirakata | |
| 2015/0227248 A1 | 8/2015 | Yamazaki et al. | |

* cited by examiner

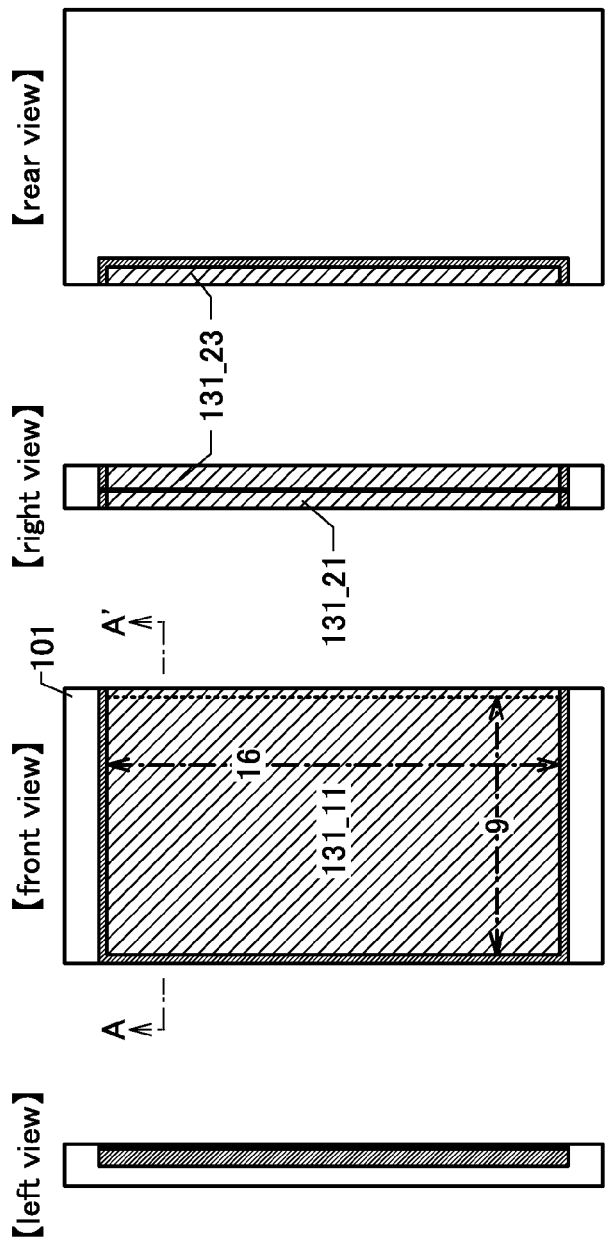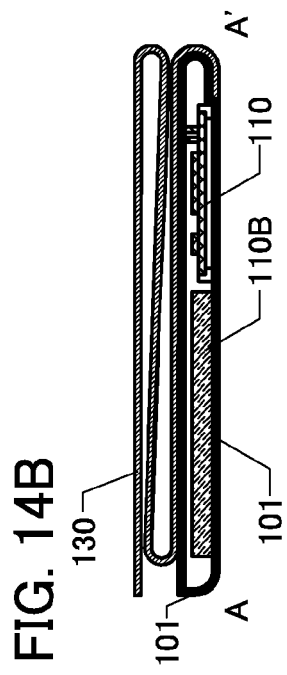

DISPLAY DEVICE AND DATA PROCESSING DEVICE

BACKGROUND OF THE INVENTION

1. Field of the Invention

The present invention relates to a display device and a data processing device.

2. Description of the Related Art

Portable data processing devices are under active development.

PATENT DOCUMENT

[Patent Document 1] Japanese Published Patent Application No. 2012-190794

SUMMARY OF THE INVENTION

A novel display device with improved convenience or high reliability, a novel data processing device with improved convenience or high reliability, a novel human interface with improved convenience or high reliability, a novel display device, a novel data processing device, or an object, a method, or the like that is apparent from the description of the specification, the drawings, the claims, or the like is provided.

One embodiment of the present invention is a display device in which a first region, a first bendable region, and a second region are arranged in this order. An object behind the display device can be temporarily or constantly viewed through the first region, the first bendable region, and the second region. The display device includes a display region which can be folded and unfolded at a fold line formed in the first bendable region.

A novel display device that is highly convenient or reliable can be provided. Another embodiment of the present invention can provide a novel data processing device that is highly convenient or reliable. Another embodiment of the present invention can provide a novel human interface that is highly convenient or reliable. Another embodiment of the present invention can provide a novel display device or a novel data processing device. Note that the description of these effects does not disturb the existence of other effects.

BRIEF DESCRIPTION OF THE DRAWINGS

FIGS. 14A and 14B are examples of a hexahedral view and a cross-sectional view illustrating a data processing device.

DETAILED DESCRIPTION OF THE INVENTION

Figure 1A:
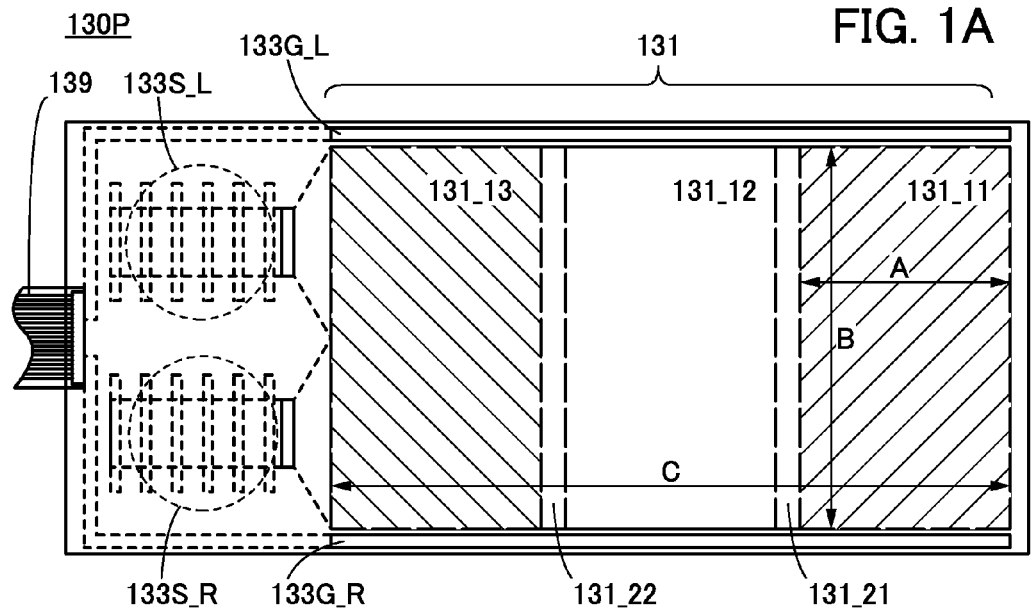
FIGS. 1A to 1C illustrate a structure example of a display panel.

Note that in this specification, an "EL layer" refers to a layer provided between a pair of electrodes in a light-emitting element. Thus, a light-emitting layer containing an organic compound that is a light-emitting substance which is interposed between electrodes is an embodiment of the EL layer.

Note that in this specification, the device includes any of the following modules in its category: a module mounted with a flexible printed circuit (FPC) or a tape carrier package (TCP); a module having a TCP provided with a printed wiring board at the end thereof; and a module having an integrated circuit (IC) directly mounted by a chip on glass (COG) method over a substrate over which an element is formed.

In this specification, one of a first electrode and a second electrode of a transistor refers to a source electrode and the other refers to a drain electrode.

Embodiments will be described in detail with reference to drawings. Note that the embodiments are not limited to the description of the following embodiments, and it is readily appreciated by those skilled in the art that modes and details of the present invention can be modified in a variety of ways without departing from the spirit and scope of the present invention. Accordingly, the embodiments should not be interpreted as being limited to the description of the embodiments below. In the structures to be given below, the same portions or portions having similar functions are denoted by the same reference numerals in different drawings, and description thereof will not be repeated.

Embodiment 1

In this embodiment, a structure of a display panel (display device) will be described with reference to FIGS. 1A to 1C, FIGS. 2A and 2B, and FIGS. 3A to 3C.

Figure 1B:
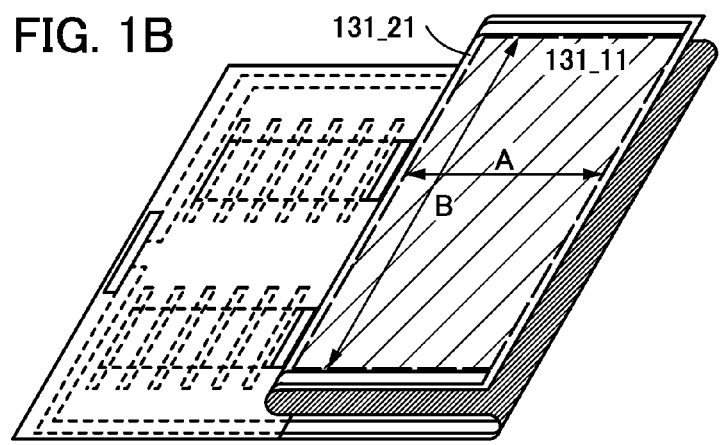
Figure 1C:
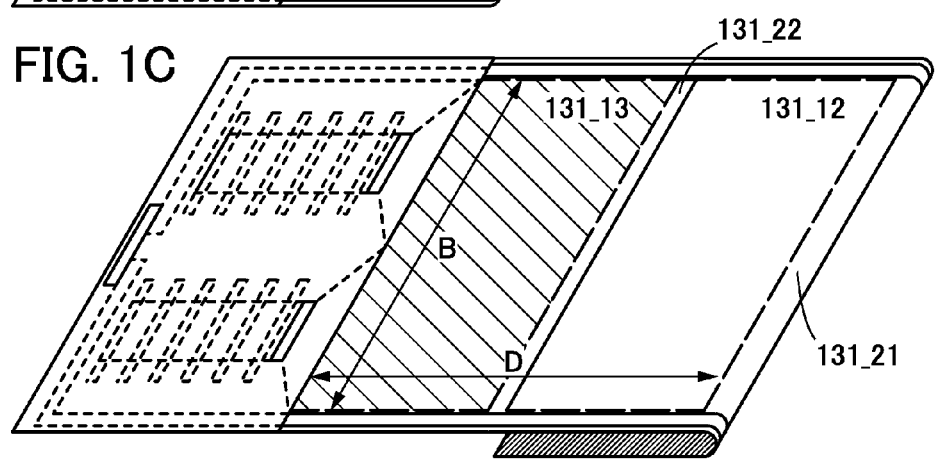

FIGS. 1A to 1C illustrate the structure of a display panel. FIG. 1A illustrates a state where a display panel 130P is unfolded. FIGS. 1B and 1C are projection views each illustrating a state where the display panel 130P in FIG. 1A is folded.

Figure 2A:
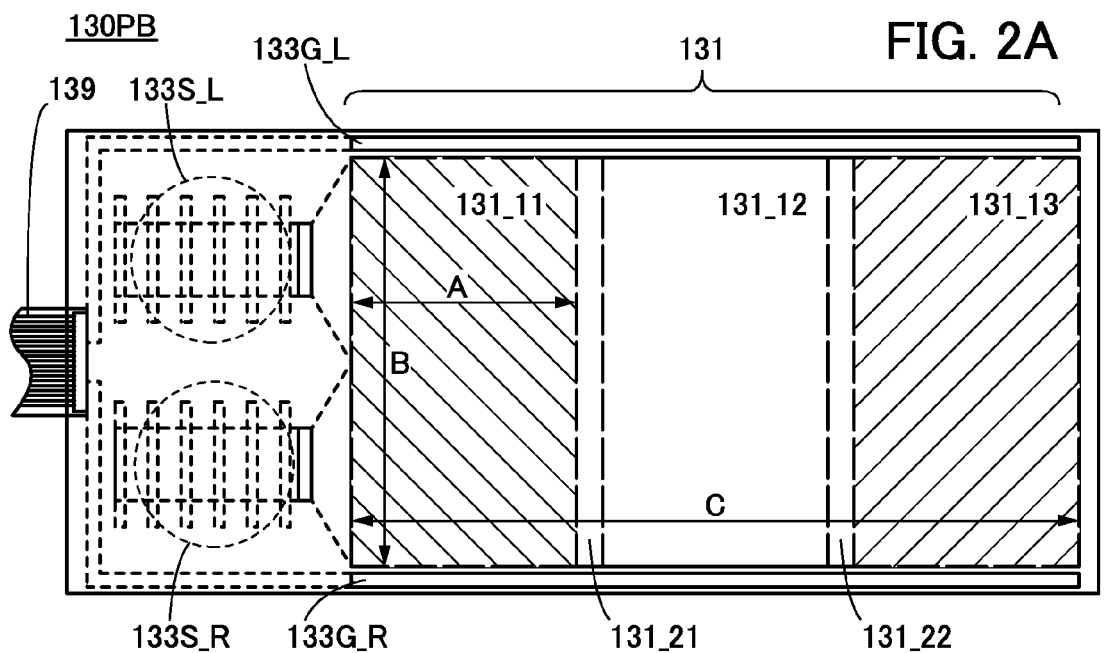
FIGS. 2A and 2B illustrate a structure example of a display panel.
Figure 2B:
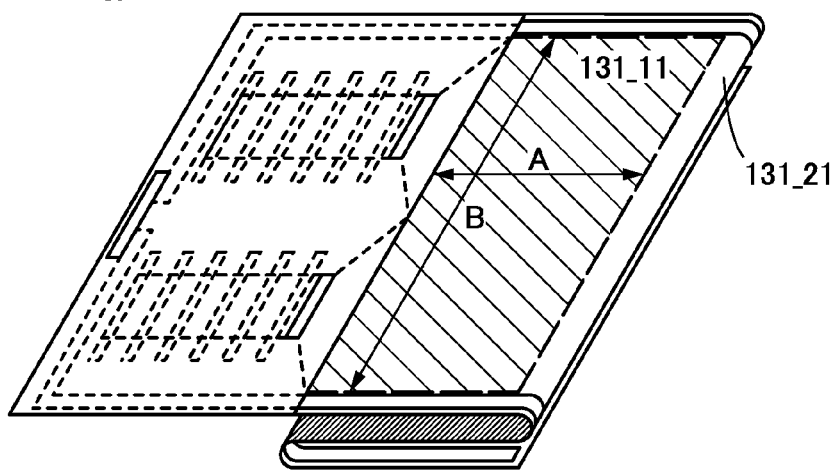

FIGS. 2A and 2B illustrate the structure of a display panel that is different from the display panel in FIGS. 1A to 1C in arrangement of display regions. FIG. 2A illustrates an unfolded display panel 130PB. FIG. 2B is a projection view illustrating the display panel 130PB in FIG. 2A that is folded.

Figure 3A:
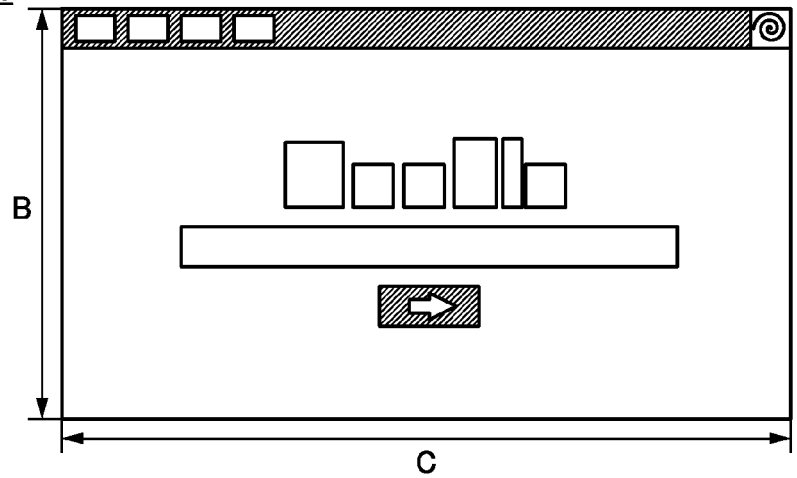
FIGS. 3A to 3C each illustrate an example of display on a display panel.
Figure 3B:
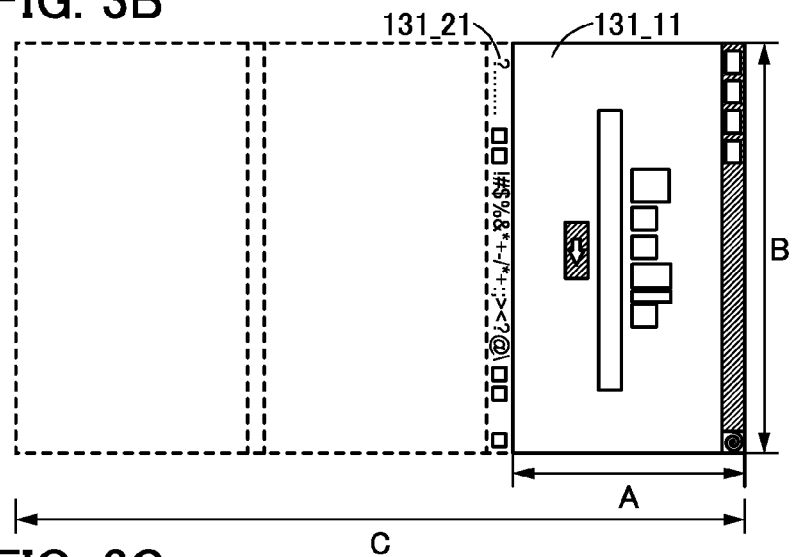
Figure 3C:
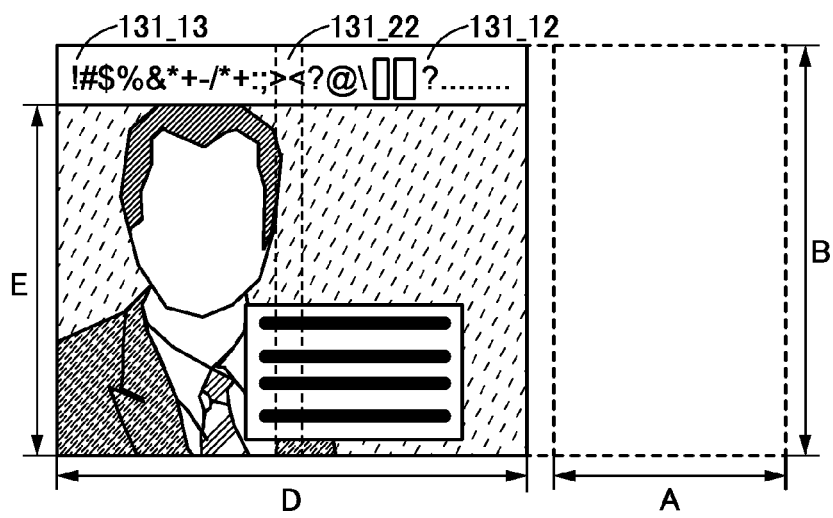

FIGS. 3A to 3C each illustrate an image displayed on a display panel. FIG. 3A is a schematic view illustrating a second image displayed on a display region. FIG. 3B is a schematic view illustrating a first image displayed on a first region. FIG. 3C is a schematic view illustrating an image displayed on a second region and a third region.

<Structure Example of Display Panel>

The display panel 130P includes a display region 131 in which a first region 131_11, a first bendable region 131_21, and a second region 131_12 are arranged in this order (see FIG. 1A). Each of the first region 131_11, the first bendable region 131_21, and the second region 131_12 can perform transmissive display by which an object behind the display panel is visible temporarily or permanently.

Transmissive display is a display mode by which a clear image or a blurred image is visible temporarily or permanently. For example, the display mode by which the view behind the display device can be hardly viewed while performing display, and the view behind the display device can be perceived while not performing display is included. As an example of the transmissive display, a transflective (see-through) display method of an organic electroluminescence display device can be given.

The display region 131 can be folded and unfolded along a fold line formed in the first bendable region 131_21. In a folded state, all or only one of the first region 131_11, the first bendable region 131_21, and the second region 131_12 may be brought into a display state or a non-display state. For example, the display region 131 is folded when the first region 131_11 and the second region 131_12 are in a display state, whereby an image displayed on the first region 131_11 and an image displayed on the second region 131_12 can be shown together to overlap with each other.

The display panel 130P may include the display region 131 where the first region 131_11, the first bendable region 131_21, the second region 131_12, a second bendable region 131_22, and a third region 131_13 are arranged in this order. The display region 131 can be folded and unfolded along a first fold line formed in the first bendable region 131_21 and a second fold line formed in the second bendable region 131_22.

An object behind the display panel is visible temporarily or permanently through each of the first region 131_11, the first bendable region 131_21, the second region 131_12, the second bendable region 131_22, and the third region 131_13.

The display panel 130P described in this embodiment includes the display region 131 where the first region 131_11, the first bendable region 131_21, and the second bendable region 131_12 are arranged in this order. The display region 131 can be folded along the first bendable region 131_21 such that the ratio of the length A of the short side of the first region 131_11 to the length B of the long side thereof (A/B) is 0.9 times or more and 1.1 times or less the ratio of the length B of the short side of the display region 131 to the length C of the long side thereof (B/C) (see FIGS. 3A and 3B).

With such a structure, an image having approximately the same ratio of the vertical length to the horizontal length as an image displayed on the first region of the display region in a folded state can be displayed on the display region in an unfolded state. Thus, the novel display panel can be highly convenient or reliable.

The display panel 130P may further be provided with a first scan line driver circuit 133G_L, a second scan line driver circuit 133G_R, a first signal line driver circuit 133S_L, and a second signal line driver circuit 133S_R.

In addition, the display panel 130P may be electrically connected to a flexible printed circuit (FPC) 139, and receive a signal from the outside of the display panel. In addition, the display panel 130P may include an image processor, another processor, a camera, a microphone, a speaker, a connection terminal, a battery, a wireless chip, a card slot, an antenna, another element, a circuit, or the like. Alternatively, the display panel 130P and a housing may be integrated, and the housing may be provided with any of these elements, the circuit, or the like.

For example, a processor, a camera, a microphone, a speaker, a connection terminal, a battery, a wireless chip, a card slot, an antenna, another element, a circuit, or the like may be provided to overlap with the first signal line driver circuit 133S_L and the second signal line driver circuit 133S_R.

Individual components included in the display panel 130P will be described below. Note that these components cannot be clearly distinguished and one component also serves as another component or include part of another component in some cases.

For example, a touch panel in which a touch sensor is provided so as to overlap with a display panel serves as a positional data input portion as well as a display portion.

<<Overall Structure>>

The display panel 130P includes the display region 131 (see FIG. 1A).

The display panel 130P may further be provided with a first scan line driver circuit 133G_L, a second scan line driver circuit 133G_R, a first signal line driver circuit 133S_L, and a second signal line driver circuit 133S_R.

<<Display Region>>

The display region 131 is supplied with image data and performs display based on the image data. Note that, for simplification, the expression "display image data" is also used for describing the situation where display based on image data is performed. The display region 131 includes display elements, each of which displays an image corresponding thereto.

The display region 131 includes the first region 131_11, the first bendable region 131_21, the second region 131_12, the second bendable region 131_22, and the third region 131_13. An object behind the display panel is visible temporarily and permanently through each of the first region 131_11, the first bendable region 131_21, the second region 131_12, the second bendable region 131_22, and the third region 131_13.

The first region 131_11 has short sides and long sides. The length of the long side of the first region 131_11 is approximately equal to that of the short side of the display region 131.

The ratio of the length A of a short side of the first region 131_11 to the length B of a long side thereof (A/B) is preferably 0.9 times or more and 1.1 times or less the ratio of the length B of a short side of the display region 131 to the length C of a long side thereof (B/C), but not limited thereto.

The display region 131 can be bent along the first bendable region 131_21 and the second bendable region 131_22. The first bendable region 131_21 and the second bendable region 131_22 each include a display element held between two substrates that are transparent and flexible.

For example, a resin can be used for the transparent and flexible substrate. Specifically, a material that contains polyester, polyolefin, polyamide (e.g., nylon, aramid), polyimide, polycarbonate, or a resin having an acrylic bond, a urethane bond, an epoxy bond, siloxane bond, or the like can be used for the transparent and flexible substrate.

The first fold line is formed in the first bendable region 131_21 and the second fold line is formed in the second bendable region 131_22, and the display region 131 can be folded along the first fold line and the second fold line (see FIGS. 1B and 1C). In other words, the display region 131 can be folded along the first fold line formed by mountain-folding a surface of the first bendable region 131_21 that can perform display and the second fold line formed by valley-folding a surface of the second bendable region 131_22 that can perform display.

Furthermore, the first bendable region 131_21 and the second bendable region 131_22 can be repeatedly folded and unfolded. For example, an image can be displayed on a fold line formed on the surface of the first bendable region 131_21 or the second bendable region 131_22 that can perform display.

FIG. 1B illustrates the display panel 130P folded such that an image can be displayed on the first region 131_11. FIG. 1C illustrates the display panel folded such that an image can be displayed on the third region 131_13.

Note that the display panel is not limited to the one where a display region is located as illustrated in FIG. 1A.

For example, the first region 131_11 may be located on the side where the flexible printed circuit FPC 139 is located as in the display panel 130PB (see FIG. 2A).

FIG. 2B illustrates the display panel 130PB folded such that an image displayed on the first region 131_11 is visible.

Furthermore, the first region 131_11 may be located between the second region 131_12 and the third region 131_13.

The ratio of the length A of the short side to the length B of the long side of the first region 131_11 is preferably approximately 9:16, in which case the display region 131 can be used without waste and a wide and large image can be displayed.

The ratio of the length A of a short side of the first region 131_11 to the length B of a long side thereof (A/B) may be 0.9 times or more and 1.1 times or less the ratio of the length B of a short side of the display region 131 to the length C of a long side thereof (B/C).

Specifically, the first bendable region 131_21 is provided such that the ratio of the length A of the short side of the first region 131_11 to the length B of the long side thereof is 9:16. In addition, the ratio of the length B of the short side of the display region 131 to the length C of the long side thereof can be 16:28.4 ($\approx$16×16÷9). Note that the ratio of the length A of the short side and the length B of the long side is not limited thereto.

Thus, the first image with a ratio of the vertical length to the horizontal length of 9/16 can be favorably displayed on the first region 131_11 (see FIG. 3B). Furthermore, the second image approximately similar to the first image can be favorably displayed on the display region 131 (see FIG. 3A). Note that the image illustrated in FIG. 3B can be referred to as a downsized image of FIG. 3A, and the image illustrated in FIG. 3A can be referred to as an enlarged image of FIG. 3B. Note that in this specification, the first image is approximately similar to the second image when the ratio of a component of a second vector connecting a point of the second image that corresponds to one point of the first image and a point of the second image that corresponds to another point of the first image to a component of a first vector connecting one point and another point of the first image is greater than or equal to 0.75 and less than or equal to 1.25, preferably greater than or equal to 0.9 and less than or equal to 1.1.

Furthermore, 1080×1920 pixels may be arranged in a matrix in the short side and long side directions of the display region 131 such that an image that conforms to the standard of full high vision broadcast can be displayed.

The display region 131 is provided with display elements. For example, the display elements may be arranged in a matrix in the display region 131, and the display elements arranged in a matrix may be driven by a passive matrix method or an active matrix method.

A touch sensor is provided on the display panel 130P, whereby a touch panel can be formed. Specifically, the touch sensor may be placed on the display surface side of the display panel 130P, or the touch sensor and the display panel 130P may be integrated into one unit. In other words, either of an on-cell touch panel or an in-cell touch panel may be employed.

Note that specific examples of a structure that can be employed for the display panel 130P will be described in Embodiments 5 to 7.

This embodiment can be combined with any of the other embodiments in this specification as appropriate.

Embodiment 2

Figure 4:
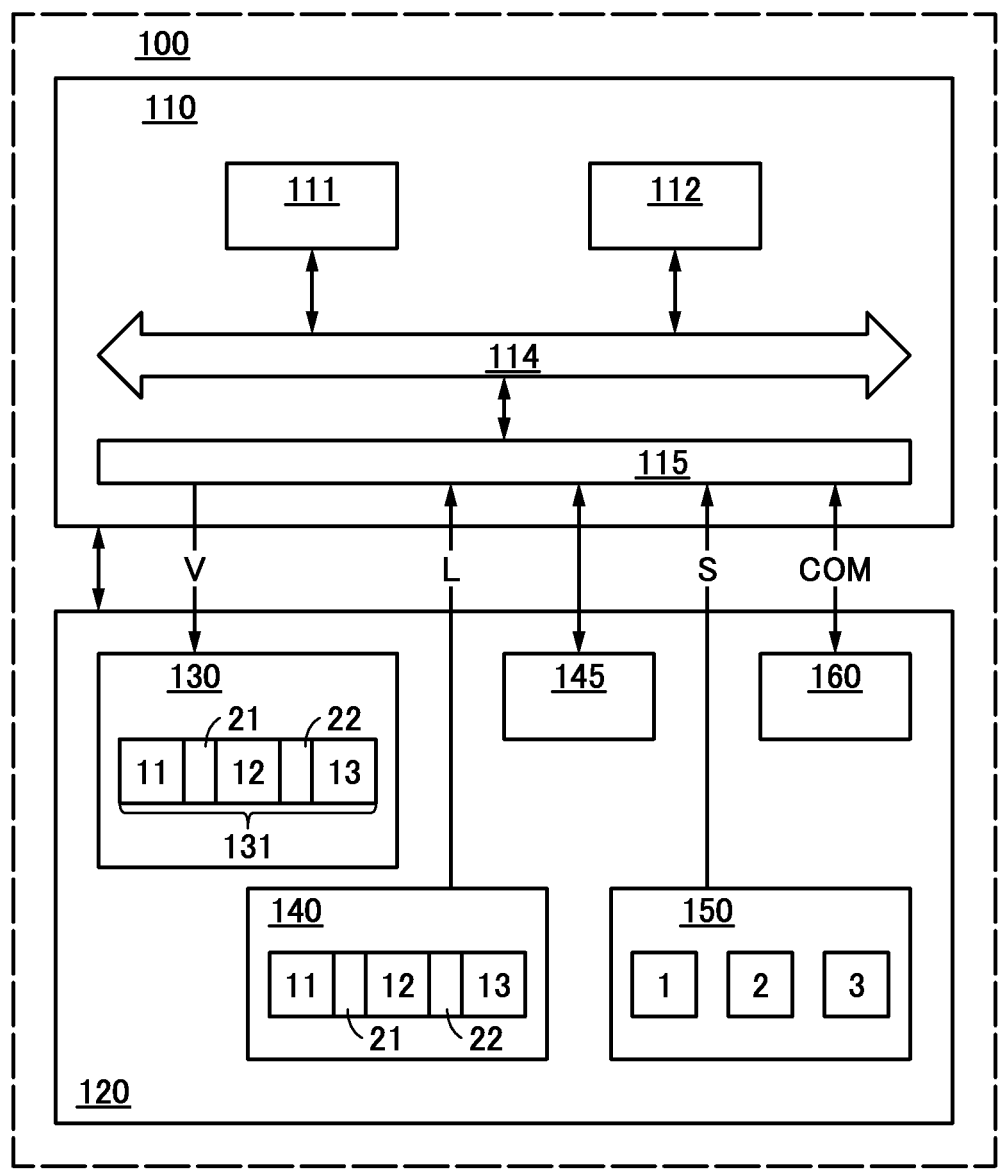
FIG. 4 is a block diagram illustrating a structure example of a data processing device.

In this embodiment, the structure of a data processing device will be described with reference to FIGS. 1A to 1C, FIGS. 2A and 2B, FIGS. 3A to 3C, and FIG. 4. FIG. 4 shows a block diagram illustrating the structure of a data processing device.

The data processing device 100 includes the input-output device 120 and the arithmetic device 110. The input-output device 120 includes the display portion 130 and the sensor portion 150. The display portion 130 is supplied with the image data V and can be folded. The sensor portion 150 determines whether the display portion 130 is folded or whether it is unfolded and supplies the sensing data S containing the determined state. The arithmetic device 110 supplies the image data V and is supplied with the sensing data S.

The arithmetic device 110 supplies the image data V by which the first image as large as to fit the first region 131_11 is displayed in the case where the sensing data S contains data showing the folded state, and supplies the image data V by which a second image that is approximately similar to the first image and fits the display region 131 of the display portion 130 in the case where the sensing data S contains data showing the unfolded state (see FIG. 4).

The ratio of the vertical length of the second image to the horizontal length thereof may be 0.9 times or more and 1.1 times or less the ratio of the vertical length of the first image to the horizontal length thereof.

With such a structure, the second image having approximately the same ratio of the vertical length to the horizontal length as the first image that can be displayed so as to fit the first region of the folded display portion can be displayed so as to fit the display region of the unfolded display portion. Thus, the novel data processing device can be highly convenient or reliable.

Even in a folded state, an image can be displayed on the second region 131_12 when a particular instruction is given. Since an image displayed on the second region 131_12 is visible through the first region 131_11, an image displayed on the first region 131_11 and an image displayed on the second region 131_12 are easily compared with each other. At this time, the image displayed on the second region 131_12 is preferably the inverted image of the image displayed on the second region in a folded state.

Individual components included in the data processor will be described below. Note that these components cannot be clearly distinguished and one component also serves as another component or include part of another component in some cases.

For example, a touch panel in which a touch sensor is provided so as to overlap with a display panel serves as the positional data input portion 140 as well as the display portion 130.

Note that although this embodiment describes a touch sensor having a structure where the positional data input portion 140 is placed on part (e.g., only a region overlapping with the first region 131_11) or the whole of a display surface side of the display portion 130 as an example, one embodiment of the present invention is not limited to this structure. Specifically, the display portion 130 may be placed on a sensing surface side of the positional data input portion 140, or the display portion 130 and the positional data input portion 140 may be integrated into one unit. In other words, either of an on-cell touch panel or an in-cell touch panel may be employed.

<<Input-Output Device 120>>

The input-output device 120 includes the display portion 130, the positional data input portion 140, an input/output portion 145, the sensor portion 150, and the communication portion 160.

<<Display Portion 130>>

The display portion 130 is supplied with the image data V and can display the image data V (see FIG. 4).

The display portion 130 includes the display region 131 and displays the image data V on the display region 131.

The display region 131 includes the first region 131_11, the first bendable region 131_21, the second region 131_12, the second bendable region 131_22, and the third region 131_13.

The ratio of the length of a short side of the first region 131_11 to the length of a long side thereof may be 0.9 times or more and 1.1 times or less the ratio of the length of a short side of the display region to the length of a long side thereof, but not limited thereto.

The first bendable region 131_21 and the second bendable region 131_22 can display the image data V and can be bent.

For example, the first bendable region 131_21 and the second bendable region 131_22 can be bent with a radius of curvature of 10 mm or less, preferably 8 mm or less, more preferably 5 mm or less, still more preferably 3 mm or less.

The display portion 130 can be folded such that a first fold line is formed in the first bendable region 131_21 and can be unfolded along the first fold line.

The display portion 130 can be folded such that a second fold line is formed in the second bendable region 131_22 and can be unfolded along the second fold line.

The first region 131_11 and the second region 131_12 may be driven together. For example, one scan line driver circuit may supply signals to select scan lines.

The first region 131_11 and the second region 131_12 may be driven separately. For example, separate scan line driver circuits may be provided for the regions, and the scan line driver circuits may supply signals to select scan lines to the corresponding regions.

For example, while the data processing device 100 is in the standby state, only the first region 131_11 and/or the first bendable region 131_21 may be driven and the driving of the other regions may be stopped. Alternatively, while the data processing device 100 is folded, only the first region 131_11 and/or the first bendable region 131_21 may be driven and the driving of the other regions that cannot be viewed may be stopped. Stopping the driving of the other regions can reduce power consumption.

For example, the display panel described in Embodiment 1 can be used for the display portion 130.

Note that specific examples of a structure that can be employed for the display portion 130 will be described in Embodiments 5 to 7.

<<Sensor Portion 150>>

The sensor portion 150 can determine the states of the data processing device 100 and/or the circumstances and supply the sensing data S (see FIG. 4).

The sensor portion 150 is provided with a sensing circuit 150_1, a sensing circuit 150_2, and a sensing circuit 150_3 that determines whether the display portion 130 is folded or whether it is unfolded.

The sensor portion 150 supplies the sensing data S containing data that shows the folded or unfolded state of the display portion 130.

The folded or unfolded state of the display portion 130 can be sensed by various sensors.

The folded state of the display portion 130 can be sensed by, for example, a mechanical switch, an optical switch, a magnetic sensor, a photoelectric conversion element, a MEMS pressure sensor, or a pressure-sensitive sensor.

For example, an object which prevents a user from viewing the display of the second region 131_12 or the third region 131_13 is sensed, whereby the folded state of the display portion 130 can be sensed.

Specifically, the photoelectric conversion element is provided in the data processing device 100 such that the second region 131_12 can determine the intensity of light incident from the surface side where the image data V is displayed, and the third region 131_13 is sensed by the photoelectric conversion element to determine whether the display portion 130 is folded along the second bendable region 131_22.

Note that the sensor portion 150 may sense acceleration, angular acceleration, a direction, pressure, a global positioning system (GPS) signal, temperature, humidity, or the like and supply data thereon.

<<Positional Data Input Portion 140>>

The positional data input portion 140 senses an approaching object and supplies positional data L of the approaching object.

For example, a user of the data processing device 100 can supply a variety of operating instructions to the data processing device 100 by making his/her finger, palm, or the like in proximity to the positional data input portion 140.

For example, an operating instruction including a termination instruction (an instruction to terminate the program) can be supplied.

The positional data input portion 140 is provided with a first positional data input portion 140_11, a second positional data input portion 140_12, a third positional data input portion 140_13, a fourth positional data input portion 140_21, and a fifth positional data input portion 140_22.

The positional data input portion 140 may be provided so as to overlap with the display portion 130.

Specifically, the first positional data input portion 140_11 is provided so as to overlap with the first display region 131_11, the second positional data input portion 140_12 is provided so as to overlap with the second region 131_12, the third positional data input portion 140_13 is provided so as to overlap with the third region 131_13, the fourth positional data input portion 140_21 that is bendable is provided so as to overlap with the first bendable region 131_21, and the fifth positional data input portion 140_22 that is bendable is provided so as to overlap with the second bendable region 131_22.

Note that in the case where the positional data input portion 140 is provided on the side closer to a user than the display portion 130, the positional data input portion 140 that has a light-transmitting property is provided.

The first positional data input portion 140_11 can be driven either together with or separately from any of the other positional data input portions.

For example, in the case where the sum of power consumed by the first positional data input portion 140_11 and power consumed by the second positional data input portion 140_12 is larger than power consumed by the first positional data input portion 140_11, only the first positional data input portion 140_11 may be driven and the drive of the second positional data input portion 140_12 may be stopped in a standby state of the data processing device 100. Stopping the drive of the second positional data input portion 140_12 can reduce power consumption.

For example, a proximity sensor can be used for the positional data input portion 140. The proximity sensor senses the proximity or touch of a target (e.g., a finger or a palm), and a capacitor or an imaging element can be used as the proximity sensor. Note that a substrate provided with capacitors arranged in matrix can be referred to as a capacitive touch sensor, and a substrate provided with an imaging element can be referred to as an optical touch sensor.

Note that structural examples that can be used for the positional data input portion 140 that is flexible and bendable will be described in Embodiments 5 to 7.

<<Communication Portion 160>>

The communication portion 160 supplies data COM supplied by the arithmetic device 110 to a device or a communication network outside the data-processing device 100. Furthermore, the communication portion 160 acquires the data COM from the device or communication network outside the data-processing device 100 and supplies the data COM.

The data COM can include a variety of instructions or the like in addition to phonetic data and image data. For example, the data COM can contain an operating instruction to make the arithmetic portion 111 generate or delete the image data V.

A communication means or connection to the external device or external communication network, e.g., a hub, a router, or a modem, can be used for the communication portion 160. Note that the connection method is not limited to a method using a wire, and a wireless method (e.g., radio waves or infrared rays) may be used.

<<Input/Output Portion 145>>

As the input/output portion 145, for example, a camera, a microphone, a read-only external storage portion, an external storage portion, a scanner, a speaker, or a printer can be used.

Specifically, as a camera, a digital camera, digital video camera, or the like can be used.

As an external memory portion, a hard disk, a removable memory, or the like can be used. As a read-only external memory portion, a CD-ROM, a DVD-ROM, or the like can be used.

<<Arithmetic Device>>

The arithmetic device 110 includes the arithmetic portion 111 and the storage portion 112. The arithmetic device 110 supplies the image data V and is supplied with the sensing data S (see FIG. 4).

For example, the arithmetic device 110 supplies the image data V by which an image for operation of the data processing device 100 is displayed.

Note that the image data V is displayed on the display region 131 of the display portion 130.

The arithmetic device 110 may be configured to be supplied with the positional data L. For example, by touching the position of the positional data input portion 140 overlapping with the image used for operation, which is displayed on the display portion 130, with a finger or the like, a user can supply an operating instruction associated with the image to the arithmetic device 110.

The arithmetic device 110 may further include the transmission path 114 and the input/output interface 115.

<<Arithmetic Portion>>

The arithmetic portion 111 executes the program stored in the memory portion 112. For example, in response to supply o the positional data L of a position in which an image used for operation is displayed, the arithmetic portion 111 executes a program associated with the image.

<<Memory Portion>>

The memory portion 112 stores the program to be executed by the arithmetic portion 111.

Note that an example of the program to be executed by the arithmetic device 110 is described in Embodiment 3.

<<Input/Output Interface and Transmission Path>>

The input/output interface 115 supplies data and is supplied with data.

The transmission path 114 can supply data, and the arithmetic portion 111, the memory portion 112, and the input/output interface 115 are supplied with data. In addition, the arithmetic portion 111, the memory portion 112, and the input/output interface 115 can supply data and the transmission path 114 is supplied with data.

<<Housing>>

The data processing device 100 may include a housing to protect the arithmetic device 110 or the like from various kinds of stresses applied to the data processing device 100. The housing can be formed using a transparent material such as plastic or glass.

This embodiment can be combined with any of the other embodiments in this specification as appropriate.

Embodiment 3

In this embodiment, a structure of a program that can be used in the data processing device 100 will be described with reference to FIGS. 5 and 6. Here, as illustrated in FIG. 1A, the data processing device 100 includes the first region 131_11, the second region 131_12, the third region 131_13, the first bendable region 131_21, and the second bendable region 131_22.

Figure 5:
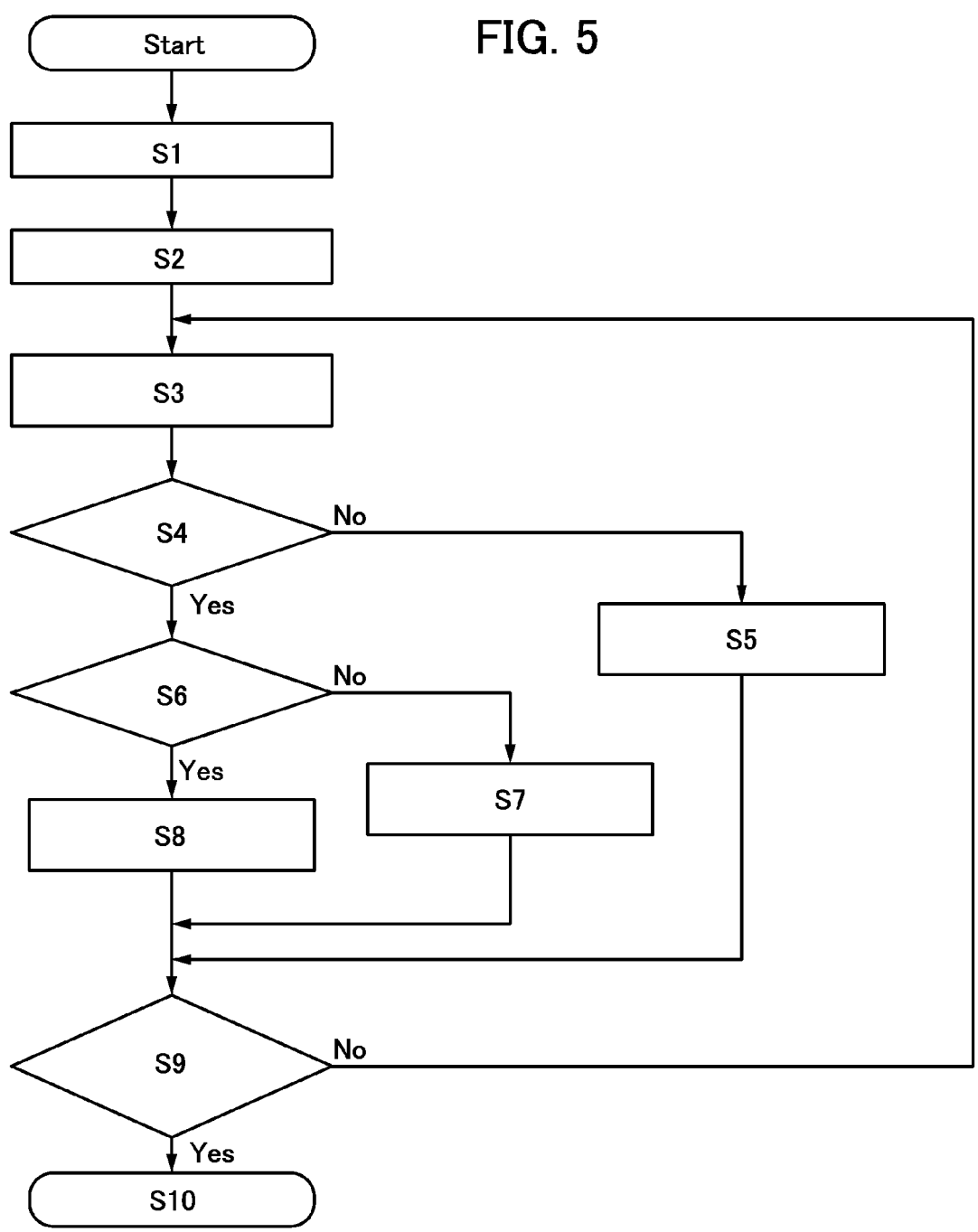
FIG. 5 is a flow chart illustrating a program.

FIG. 5 is a flow chart of a program that is executed by an arithmetic device of the data processing device. FIG. 6 is a flow chart illustrating an interrupt processing of a program described with reference to FIG. 5.

<Example of Structure of Data Processing Device>

The data processing device 100 described in this embodiment includes the arithmetic portion 111 and the storage portion 112 that stores a program to be executed by the arithmetic portion 111.

The program stored by the storage portion 112 includes the following steps.

<<First Step>>

In a first step, initial data containing status data is acquired (51 in FIG. 5).

For example, the initial data that contains predetermined status data stored by the storage portion 112 and necessary data used in a later step are acquired. The initial data may contain the sensing data S supplied from the sensor portion 150.

Specifically, the status data showing a first status or a second status is acquired. In the first status, the sensing data S supplied from the sensor portion 150 contains data that shows the state where the display portion 130 is folded as illustrated in FIG. 1B. In the second status, the sensing data supplied from the sensor portion 150 contains data that shows the state where the display portion 130 is unfolded. Although only the above two statuses are considered below for simple explanation, a program adapted to a folded state illustrated in FIG. 1C and other folded states can be similarly configured.

<<Second Step>>

In a second step, interrupt processing is allowed (S2 in FIG. 5). Note that when the interrupt processing is allowed, the arithmetic portion 111 can receive an instruction to execute the interrupt processing. When the interrupt processing is allowed, the arithmetic portion 111 stops the main processing, executes the interrupt processing, and stores the execution result in the storage portion, for example. Consequently, the arithmetic portion that has recovered from the interrupt processing can resume the main processing on the basis of the stored execution result of the interrupt processing.

<<Third Step>>

In a third step, predetermined data is acquired (S3 in FIG. 5).

The predetermined data contains data that is the basis for a first image, a second image, or a third image that is to be generated in a later step. Here, the first image is an image whose size is optimized to display the image in the first region 131_11, the second region 131_12, the third region 131_13, the first bendable region 131_21, and the second bendable region 131_22; and the second image is an image whose size is optimized to display the image in only the first region 131_11. In addition, the third image is an image displayed on the first region 131_11 and the second region 131_12. Especially, an image displayed on the second region 131_12 is viewed through the first region 131_11; thus, the size of the image is optimized to be displayed on the first region 131_11 and the second region 131_12.

When the program proceeds from a ninth step to the third step, an operating instruction or updated status data supplied by the interrupt processing is reflected in the third step.

<<Fourth Step>>

In a fourth step, a sixth step is selected when the status data shows a first status, or a fifth step is selected when the status data shows a second status (S4 in FIG. 5).

<<Fifth Step>>

In a fifth step, the image data V by which the first image is displayed is generated on the basis of data acquired in the third step, and is displayed (S5 in FIG. 5). That is, the first image is displayed on the first region 131_11, the second region 131_12, the third region 131_13, the first bendable region 131_21, and the second bendable region 131_22 (first display).

<<Sixth Step>>

In a sixth step, the program proceeds to a seventh step in the case where transparent display is not performed, and the program proceeds to an eighth step in the case where transparent display is performed (S6 in FIG. 5).

<<Seventh Step>>

The image data V by which the second image fits the first region 131_11 is generated on the basis of data acquired in the third step, and the image data V is displayed (S7 in FIG. 5). That is, the second image is displayed only on the first region 131_11 (second display).

For example, the image data V by which an image whose area is adjusted so as to fit the first region 131_11 is displayed is generated on the basis of the data acquired in the third step.

For example, when data containing numerics or alphabets is acquired in the third step and the folded state of the display portion 130 is sensed, the image data V for displaying the first image where numerics or alphabets are arranged in the first region 131_11 in a landscape position so as to be easily read is generated.

For example, the image data V by which an image whose size is adjusted so that the image fits the display region of the display portion is displayed is generated on the basis of data acquired in the third step.

For example, when data containing numerics or alphabets is acquired in the third step and the unfolded state of the display portion 130 is sensed, the image data V by which the second image where the numerics or alphabets are arranged in the display portion 130 in a landscape position so as to be easily read is displayed is generated.

<<Eighth Step>>

The image data V by which the third image is displayed is generated on the basis of data acquired in the third step, and is displayed (S8 in FIG. 5). That is, the third image is displayed on the first region 131_11 and the second region 131_12 (third display). Here, the image on the second region 131_12 is visible through the first region 131_11. However, in this case, the image on the second region 131_12 is viewed from the side opposite to the side on which the first display is performed; thus, the second region 131_12 is viewed in a horizontally or vertically inverted state when display is performed in a manner similar to that for the first display. Therefore, the image on the second region 131_12 at the time of the third display is the inverted image of the image on the second region 131_12 at the time of the first display. The image on the second region 131_12 at the time of the first display is inverted with the first fold line formed in the first bendable region 131_21 as an axis.

<<Ninth Step>>

In a seventh step, a tenth step is selected when a termination instruction is supplied in the interrupt processing, or the third step is selected when no termination instruction is supplied in the interrupt processing (S9 in FIG. 5).

<<Tenth Step>>

In the tenth step, the program terminates (S10 in FIG. 5).

Although the number of the folded state is only one in the above example, in the fifth step in the above program, for example, the image data V is generated so that the second image fits a region other than the first region 131_11 in the case where the state where the display portion is folded in two along the first bendable region 131_21 (the status which is different from the first status) is sensed, and the second image may be displayed on the region other than the first region 131_11 (FIG. 3C). Accordingly, an image with a ratio of the horizontal length D to the vertical length E (E:D) of approximately 3:4 or a ratio close to 3:4 can be favorably displayed.

The image data V may be generated such that the second image is located on the upper side or the lower side of the region other than the first region so as to fit the region other than the first region.

The second image can include an image broadcasted on television or the like as well as a software keyboard, text, and a photograph image.

<<Interrupt Processing>>

The interrupt processing includes the following steps.

<<Eleventh Step>>

Figure 6:
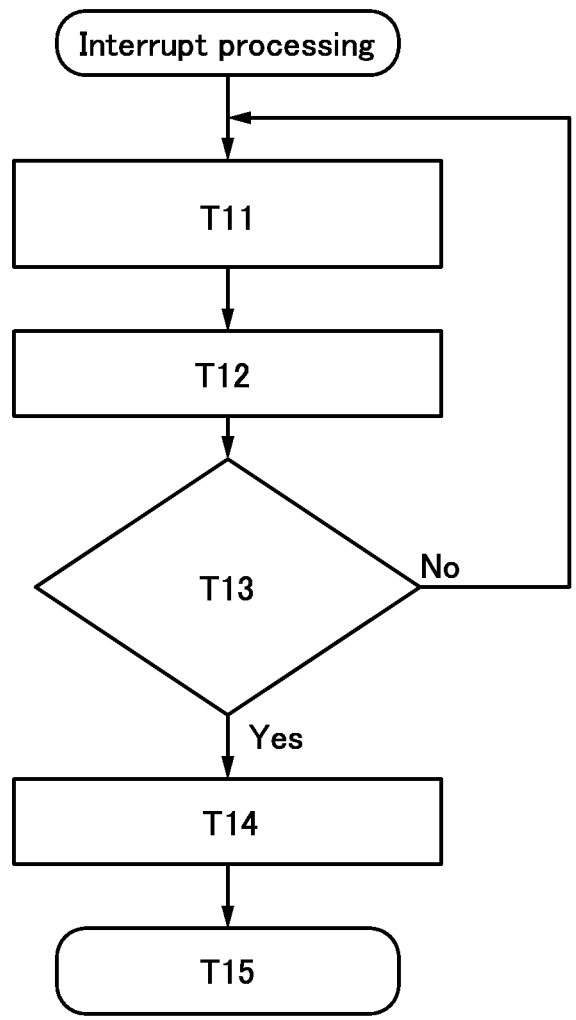
FIG. 6 is a flow chart illustrating a program.

In an eleventh step, the sensing data S is acquired (T11 in FIG. 6).

For example, the sensing data S supplied from the sensor portion 150 is acquired using a timer or the like. Specifically, the sensing data S containing data that shows the folded or unfolded state of the display portion 130 is acquired.

<<Twelfth Step>>

In a twelfth step, candidate data is determined based on the sensing data S (T12 in FIG. 6).

<<Thirteenth Step>>

In a thirteenth step, a fourteenth step is selected when the candidate data differs from the status data, or the eleventh step is selected when the candidate data is the same as the status data (T13 in FIG. 6).

<<Fourteenth Step>>

In the fourteenth step, the status data is updated to the candidate data (T14 in FIG. 6).

For example, the status data is updated when there is a change in the sensing data S. Specifically, the status data is updated when there is a change in data that shows the folded or unfolded state of the display portion 130.

<<Fifteenth Step>>

In the fifteenth step, the operation recovers from the interrupt processing (T15 in FIG. 6).

Note that the status data updated in the interrupt processing is reflected after the program proceeds from the ninth step to the third step. The operation proceeds to the tenth step and terminates when a termination instruction is supplied in the interrupt processing.

The data processing device 100 described in this embodiment is configured to perform a step of acquiring the sensing data S containing whether the display portion is folded or whether it is unfolded and determining candidate data, a step of updating the status data to the candidate data in the case where the status data is different from the candidate data, and a step of generating the image data V containing predetermined data on the basis of the updated status data and displaying the image data V. Thus, an image that contains the predetermined data and has a size based on the status data can be displayed on a predetermined region. Thus, the novel data processing device can be highly convenient or reliable.

Modification Example 1 of Program

As Modification Example 1, a modification example of a program that can be used for the data processing device will be described.

Modification Example 1 is different from the above program in that the image data V that enables a fourth image to be displayed outside the first image or the second image is generated in the fifth step, the seventh step, and the eighth step. Here, different steps will be described below. Refer to the above description for similar steps. Although not mentioned in this example, the third display can be similarly performed.

<<Fifth Step>>

In the fifth step, the image data V for displaying the first image fitting the first region 131_11, the second region 131_12, the third region 131_13, the first bendable region 131_21, and the second bendable region 131_22, and displaying the fourth image outside the region where the first image is displayed is generated on the basis of data acquired in the third step, and the image data V is displayed.

<<Seventh Step>>

In the seventh step, the image data V that enables the second image to be displayed so as to fit the first region 131_11, and the fourth image to be displayed outside the region where the second image is displayed is generated on the basis of data acquired in the third step, and the image data V is displayed.

Accordingly, the fourth image can be displayed outside the region where the first image or the second image is displayed. Thus, the novel data processing device can be highly convenient or reliable. For example, the fourth image may not be displayed when there is a specific status or instruction.

For example, the image data V by which the fourth image containing text data is displayed outside the first image or the second image may be generated and displayed. Specifically, the fourth image may be displayed on the first bendable region 131_21 (see FIG. 3B).

The fourth image that moves as if it streams may be displayed. Furthermore, the direction in which text included in the fourth image moves may be changed according to the rule of a language that is displayed. For example, English text may move from right to left, and Arabian text may move from left to right. The speed at which text moves may be changed to meet the user's needs.

Text data or the like may be superimposed on the first image or the second image.

The fourth image may include a phone number, a temperature, a received e-mail, or the like.

Modification Example 2 of Program

As Modification Example 2, a modification example of a program that can be used for the data processing device will be described.

In the data processing device 100 to which the program described in Modification Example 2 can be applied, the sensor portion 150 determines the position of the display portion 130 and supplies the sensing data S containing data that shows the determined position.

The arithmetic device 110 determines the direction of the first image or the second image on the basis of the sensing data S and generates the image data V by which the first image or the second image is displayed in the determined direction.

The data processing device 100 includes the sensor portion 150 and the arithmetic device 110. The sensor portion 150 determines the position of the display portion 130 and supplies the sensing data S containing data that shows the determined position. The arithmetic device 110 generates the image data V on the basis of the determined position. Thus, an image can be displayed on the display portion in the direction determined in accordance with the position of the display portion. Thus, the novel data processing device can be highly convenient or reliable.

For example, in the case where the position of the folded display portion 130 where the first region is used in a portrait mode or the position of the unfolded display portion 130 used in a portrait mode is sensed, text in the fourth image may be displayed vertically.

Modification Example 2 is different from the data processing device 100 described in this embodiment in the following points. The data processing device 100 of Modification Example 2 includes the sensor portion 150 that can determine the position of the display portion 130. In addition, in the first step in the above program, status data containing a combination of data that shows the folded or unfolded state of the display portion 130 and data that shows the position of the display portion 130 is acquired; in the fifth, seventh or eighth step, the direction in which the first image to the third image are displayed is determined based on the status data where the data that shows the position is combined, and the image data V by which the first image to the third image are displayed in the determined direction is generated; in the eleventh step, the sensing data S containing data that shows the position of the display portion 130 as well as data that shows the folded or unfolded state of the display portion 130 is acquired; and in the fourteenth step, the status data is updated in the case where there are changes in the data that shows the position of the display portion as well as data that shows the folded or unfolded state of the display portion. Here, different components of the sensor portion 150 and different steps will be described, and the above description is referred to for similar components of the sensor portion 150 and similar steps.

<<Sensor Portion 150>>

The sensor portion 150 determines the position of the display portion 130 and supplies the sensing signal S containing data that shows the position of the display portion 130. For example, an acceleration sensor or an angular acceleration sensor can be used as the sensor that determines the position of the display portion 130.

The sensor that determines the position of the display portion 130 is provided in a housing, for example.

Modification Example of First Step

In a first step, initial data including status data is acquired. Specifically, the status data showing a first status or a second status is acquired. In the first status, the sensing data S supplied from the sensor portion 150 contains data that shows the state where the display portion 130 is folded. In the second status, the sensing data S supplied from the sensor portion 150 contains data that shows the state where the display portion 130 is unfolded. Furthermore, data that shows whether the position of the display portion 130 is a landscape position or whether it is a portrait position is added to each status data to define four kinds of extended status data. The four kinds of extended status data are used.

Modification Example of Fifth Step

In a fifth step, the image data V for displaying the first image fitting the first region 131_11, the second region 131_12, the third region 131_13, the first bendable region 131_21, and the second bendable region 131_22 is generated on the basis of the status data showing the folded or unfolded state of the display portion and the position of the display portion that is acquired in the third step, and the image data V is displayed.

For example, the image data V by which the image whose direction and size are adjusted so as to fit the display region of the display portion in a landscape or portrait position is displayed is generated on the basis of the status data acquired in the third step.

Modification Example of Seventh Step

In a seventh step, the image data V that enables the second image as large as to fit the first region 131_11 to be displayed is generated on the basis of the status data showing the folded state of the display portion and the position of the display portion that is acquired in the third step, and the image data V is displayed. Similar modification is performed in the eighth step.

For example, the image data V that enables an image whose direction and size are adjusted so that the image fits the first region 131_11 in a landscape or portrait position to be displayed is generated on the basis of the status data acquired in the third step.

Modification Example of Eleventh Step

In an eleventh step, the sensing data S containing data that shows the position of the display portion is acquired.

For example, the sensing data S containing data that shows the folded or unfolded state of the display portion 130 and data that shows the position of the display portion is acquired.

Modification Example of Fourteenth Step

In the fourteenth step, the status data is updated to the candidate data.

Specifically, when there is a change in data that shows the folded or unfolded state of the display portion 130, the status data is updated. Specifically, the status data is updated when there are a change in data that shows the position of the display portion as well as a change in data that shows the folded or unfolded state of the display portion 130.

This embodiment can be combined with any of the other embodiments in this specification as appropriate.

Embodiment 4

In this embodiment, the structure of a data processing device will be described with reference to FIG. 4, FIGS. 7A to 7C, and FIGS. 8A and 8B.

FIG. 4 is a block diagram illustrating the structure of the data processing device.

FIGS. 7A to 7C, and FIGS. 8A and 8B illustrate the data processing device.

Figure 7A:
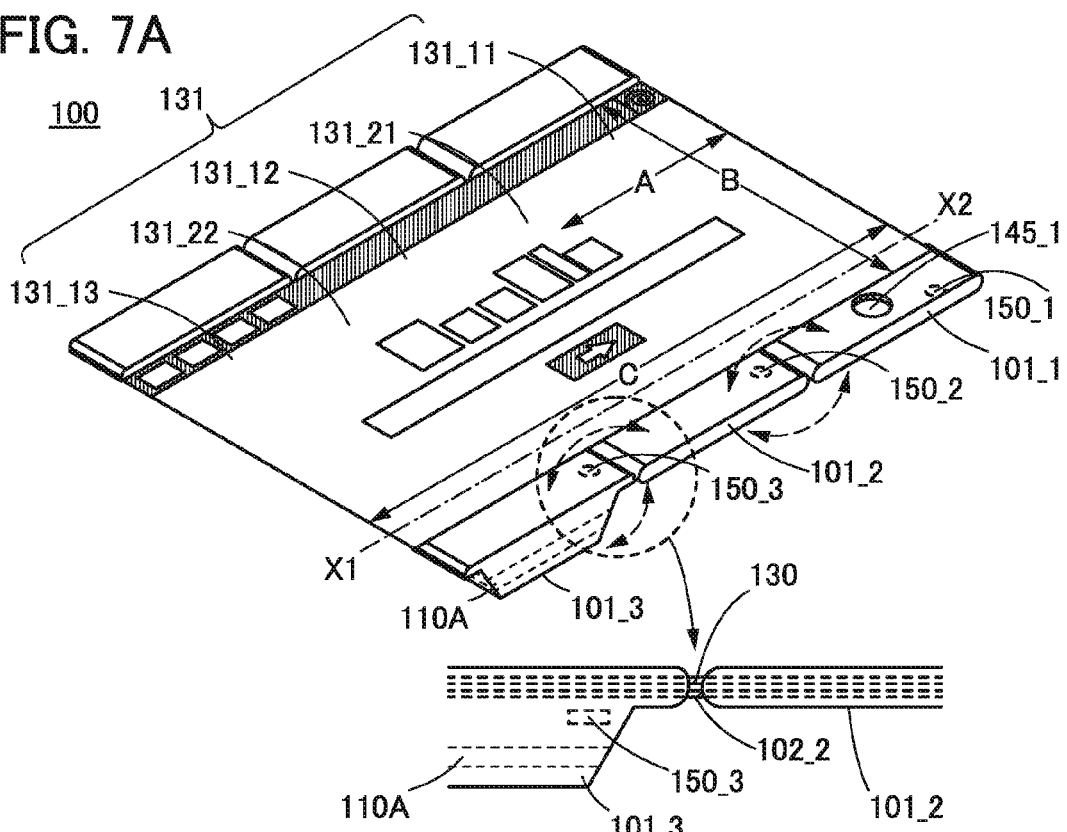
FIGS. 7A to 7C are projection drawings illustrating a structure example of a data processing device.
Figure 7B:
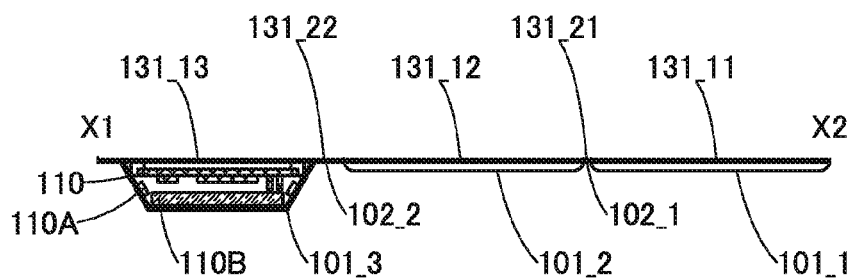
Figure 7C:
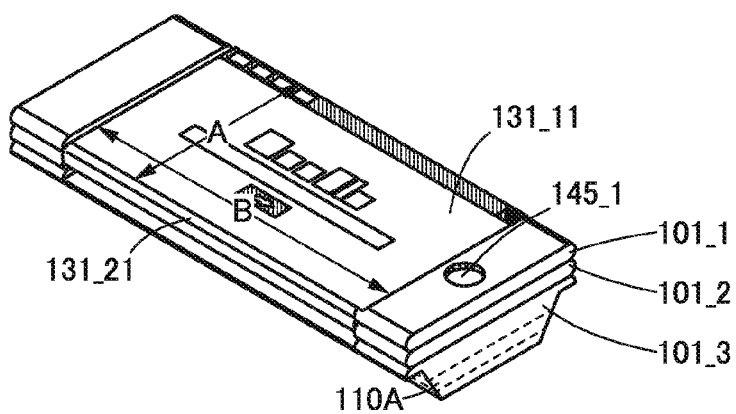

FIG. 7A is a projection view illustrating the display portion 130 of the data processing device 100 that is unfolded. FIG. 7B is a cross-sectional view of the data processing device 100 along X1-X2 in FIG. 7A. FIG. 7C is a projection view illustrating the display portion 130 that is folded.

Figure 8A:
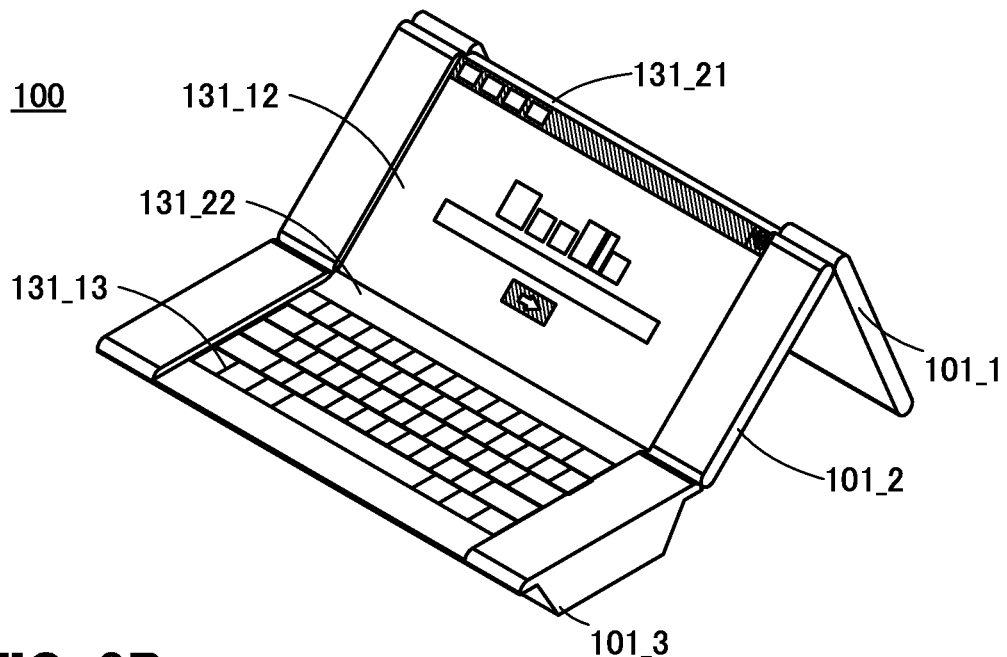
FIGS. 8A and 8B are projection drawings illustrating a structure example of a data processing device.
Figure 8B:
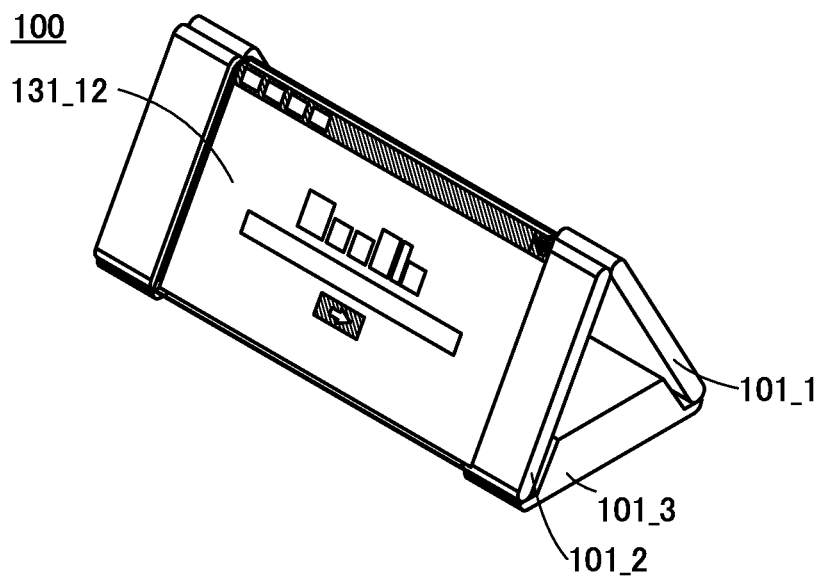

FIG. 8A is a projection view illustrating the display portion 130 of the data processing device 100 that is folded. FIG. 8B is a projection view illustrating the display portion 130 that is folded in a manner different from that in FIG. 8A.

<Example of Structure of Data Processing Device>

The data processing device 100 described in this embodiment includes an input-output device 120 that is supplied with image data V and supplies sensing data S, and an arithmetic device 110 that supplies the image data V and is supplied with the sensing data S (see FIG. 4).

The input-output device 120 includes the display portion 130 that is supplied with the image data V and the sensor portion 150 that supplies the sensing data S.

The display portion 130 includes a display region where the first region 131_11, the first bendable region 131_21, the second region 131_12, the second bendable region 131_22, and the third region 131_13 are arranged in this order (see FIG. 4 and FIG. 7A).

The ratio of the length A of a short side of the first region 131_11 to the length B of a long side thereof (A/B) is 0.9 times or more and 1.1 times or less the ratio of the length B of a short side of the display region 131 to the length C of a long side thereof (B/C).

The ratio of the length A of the short side of the first region 131_11 to the length B of the long side thereof is approximately 9:16.

The display portion 130 can be folded and unfolded along a first fold line formed in the first bendable region 131_21 and a second fold line formed in the second bendable region 131_22 (see FIGS. 7A and 7C).

The sensor portion 150 determines whether the display portion 130 is folded or whether it is unfolded and supplies the sensing data S that contains data showing the determined state (see FIG. 4).

The arithmetic device 110 supplies the image data V by which the first image as large as to fit the first region 131_11 is displayed in the case where the sensing data S contains data that shows the folded state, and supplies the image data V by which the second image that is approximately similar to the first image and fits the display region 131 of the display portion 130 is displayed in the case where the sensing data S contains data that shows unfolded state (see FIG. 4 and FIGS. 7A to 7C).

The area of the second image is 2.7 times or more and 3.3 times or less that of the first image.

The data processing device 100 described in this embodiment includes the input-output device 120 and the arithmetic device 110. The input-output device 120 includes the display portion 130 and the sensor portion 150. The display portion 130 is supplied with the image data V and can be folded. The sensor portion 150 determines whether the display portion 130 is folded or whether it is unfolded and supplies the sensing data S containing the determined state. The arithmetic device 110 supplies the image data V and is supplied with the sensing data S.

With such a structure, the second image having approximately the same ratio of the vertical length to the horizontal length as the first image that can be displayed so as to fit the first region of the folded display portion can be displayed so as to fit the display region of the unfolded display portion (see FIG. 7A). Thus, the novel data processing device can be highly convenient or reliable.

A housing 101_1, a hinge 102_1, a housing 101_2, a hinge 102_2, and a housing 101_3 are positioned in this order such that the display portion 130 can be held, folded, and unfolded (see FIGS. 7A to 7C).

The housing 101_1 overlaps with the first region 131_11 and is provided with the sensing circuit 150_1 and a button 145_1.

The housing 101_2 overlaps with the second region 131_12 and is provided with the sensing circuit 150_2.

The housing 101_3 overlaps with the third region 131_13 and is provided with the sensing circuit 150_3. The arithmetic device 110, an antenna 110A, and a battery 110B are provided in the housing 101_3.

The hinge 102_1 overlaps with the first bendable region 131_21 and connects the housing 101_1 and the housing 101_2 such that the housing 101_1 can be rotated with respect to the housing 101_2 (see FIG. 7B).

The hinge 102_2 overlaps with the second bendable region 131_22 and connects the housing 101_2 and the housing 101_3 such that the housing 101_2 can be rotated with respect to the housing 101_3.

The antenna 110A is electrically connected to the arithmetic device 110 and supplies or is supplied with a signal.

In addition, the antenna 110A is wirelessly supplied with power from an external device and supplies the power to the battery 110B.

The battery 110B is electrically connected to the arithmetic device 110 and supplies power.

Individual components included in the data-processing device 100 are described below. Note that these components cannot be clearly distinguished and one component also serves as another component or include part of another component in some cases.

For example, a touch panel in which a touch sensor is provided so as to overlap with a display panel serves as the positional data input portion 140 as well as the display portion 130.

Note that although this embodiment describes a touch sensor having a structure where the positional data input portion 140 is placed on a display surface side of the display portion 130 as an example, one embodiment of the present invention is not limited to this structure. Specifically, the display portion 130 may be placed on a sensing surface side of the positional data input portion 140, or the display portion 130 and the positional data input portion 140 may be integrated into one unit. In other words, either of an on-cell touch panel or an in-cell touch panel may be employed.

<<Overall Structure>>

The data processing device 100 includes the input-output device 120 and the arithmetic device 110 (see FIG. 4).

The data processing device 100 described in this embodiment is different from that described in Embodiment 2 in the structures of the housing 101_1, the housing 101_2, the housing 101_3, the hinge 102_1, the hinge 102_2, the antenna 110A, the battery 110B, and the button 145_1. Different portions will be described here, and the above description is referred to for the other similar portions.

<<Display Portion 130>>

The display portion 130 described in this embodiment is different from that described in Embodiment 2 in that the ratio of the length A of the short side to the length B of the long side of the first region 131_11 of the display portion 130 described in Embodiment 2 is approximately 9:16. Thus, a wide image can be displayed (see FIG. 7C).

Furthermore, 1080×1920 pixels may be arranged in a matrix in the short side and long side directions such that an image that conforms to the standard of full high vision broadcast can be displayed.

<<Arithmetic Device>>

In the sixth step, which is described in the program described in Embodiment 3, the arithmetic device 110 of one embodiment generates the image data V for displaying the second image whose area is 2.7 times or more and 3.3 times or less that of the first image fitting the display region of the display portion is generated on the basis of data acquired in the third step, and displays the image data V (S6 in FIG. 5).

For example, the image data V by which an enlarged or downsized image is displayed is generated on the basis of the sensing data S containing data that shows the folded or unfolded state of the display portion 130, and the image data V is displayed on the display portion 130.

Specifically, in the state where the display portion 130 is folded, the image data V by which the first image is displayed so as to occupy the first region 131_11 with a size that is approximately one third of the size of the display region 131 is generated, and the image data V is displayed (see FIG. 7C). In the state where the display portion 130 is unfolded, the image data V by which the second image with a size that is 2.7 times or more and 3.3 times or less the size of the first image is displayed is generated, and the image data V is displayed (see FIG. 7A).

Thus, in the state where the display portion 130 is folded, an image can be displayed so as to occupy the first region 131_11. In the state where the display portion 130 is unfolded, an image can be displayed so as to occupy the entire display region 131.

<<Other Components>>

The data processing device 100 includes the housing 101_1, the housing 101_2, and the housing 101_3. For example, resin, metal, or glass can be used for the housing (FIG. 7B).

The data processing device 100 includes the hinge 102_1 and the hinge 102_2. For example, resin or metal can be used for the hinge.

In the data processing device 100, one side of the housing 101_2 is connected to the housing 101_1 with the hinge 102_1, and the opposite side of the housing 101_2 is connected to the housing 101_3 with the hinge 102_2. With such a structure, the data processing device 100 can be varied in its form.

For example, a touch sensor may be provided so as to overlap with the third display region 131_13 which is provided substantially horizontally, and the second region 131_12 may be provided so as to be inclined at an angle with the use of the housing 101_1. In that case, a keyboard image used when a touch sensor is used as a software keyboard can be displayed on the third display region 131_13, and an input result or the like can be displayed on the second region 131_12 (see FIG. 8A).

For example, a side of the housing 101_3 to which the hinge 102_2 is not connected may be in contact with a side of the housing 101_1 to which the hinge 102_1 is not connected (see FIG. 8B).

The data processing device 100 includes the antenna 110A capable of transmitting and receiving, for example, modulated high-frequency waves.

The antenna 110A may be electrically connected to the communication portion 160 so that data supplied from the communication portion 160 can be supplied to an external device. The antenna 110A may supply the data supplied from the external device to the communication portion 160.

The antenna 110A may supply power supplied from an external wireless power feeding system to the battery 110B.

The data processing device 100 includes the battery 110B. For example, a lithium-ion battery can be used as the battery 110B.

The data processing device 100 includes the button 145_1. For example, a user of the data processing device 100 can supply an operating instruction to turn on or off the data processing device 100 by pressing the button 145_1.

This embodiment can be combined with any of the other embodiments in this specification as appropriate.

Embodiment 5

In this embodiment, the structure of a foldable touch panel that can be used in a display portion and an operating portion of the data processing device of one embodiment of the present invention will be described with reference to FIGS. 9A to 9C.

Figure 9A:
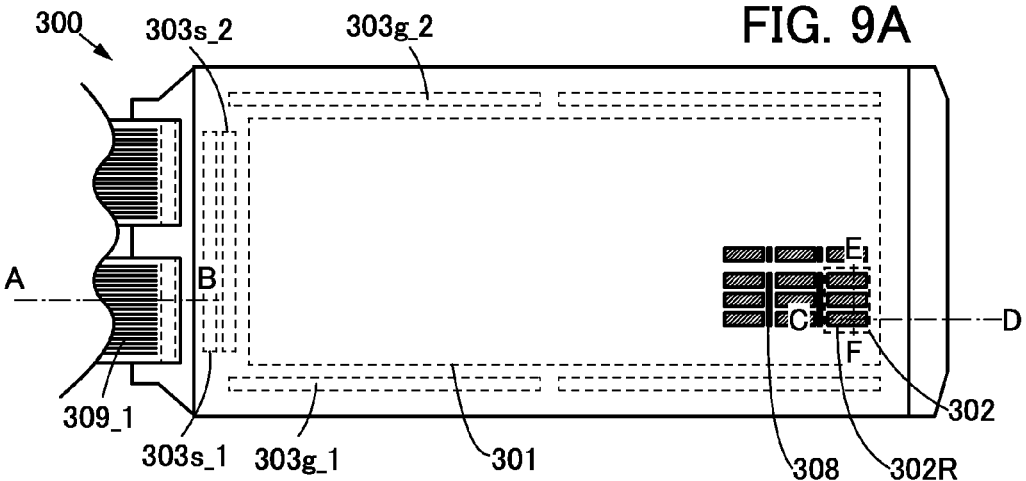
FIGS. 9A to 9C illustrate structure examples of a touch panel that can be used in a data processing device.

FIG. 9A is a top view illustrating the structure of a touch panel that can be used in the data processing device 100.

Figure 9B:
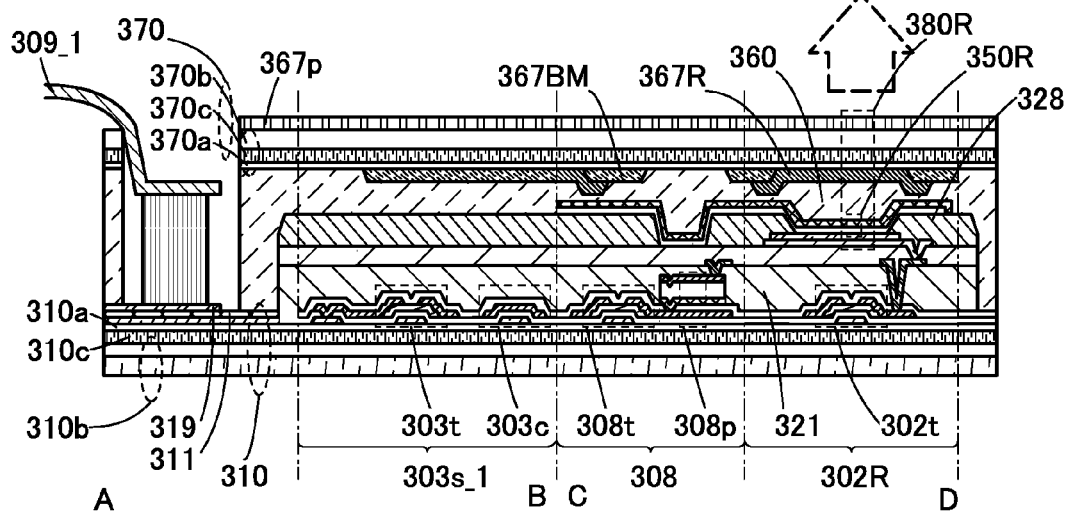

FIG. 9B is a cross-sectional view taken along line A-B and line C-D in FIG. 9A.

Figure 9C:
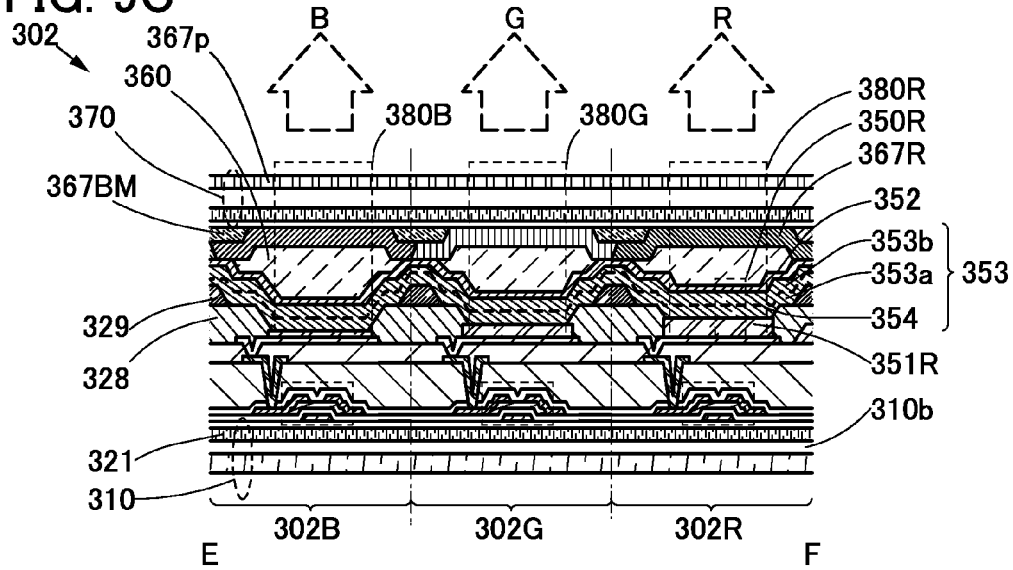

FIG. 9C is a cross-sectional view taken along line E-F in FIG. 9A.

<Top View>

A touch panel 300 described as an example in this embodiment includes a display portion 301 (see FIG. 9A).

The display portion 301 includes a plurality of pixels 302 and a plurality of imaging pixels 308. The imaging pixels 308 can sense a touch of a finger or the like on the display portion 301. Thus, a touch sensor can be formed using the imaging pixels 308.

Each of the pixels 302 includes a plurality of sub-pixels (e.g., a sub-pixel 302R). In addition, in the sub-pixels, light-emitting elements and pixel circuits that can supply electric power for driving the light-emitting elements are provided.

The pixel circuits are electrically connected to wirings through which selection signals are supplied and wirings through which image signals are supplied.

Furthermore, the touch panel 300 is provided with a scan line driver circuit 303g_1 that can supply selection signals to the pixels 302 and an image signal line driver circuit 303s_1 that can supply image signals to the pixels 302.

The imaging pixels 308 include photoelectric conversion elements and imaging pixel circuits that drive the photoelectric conversion elements.

The imaging pixel circuits are electrically connected to wirings through which control signals are supplied and wirings through which power supply potentials are supplied.

Examples of the control signals include a signal for selecting an imaging pixel circuit from which a recorded imaging signal is read, a signal for initializing an imaging pixel circuit, and a signal for determining the time it takes for an imaging pixel circuit to detect light.

The touch panel 300 is provided with an imaging pixel driver circuit 303g_2 that can supply control signals to the imaging pixels 308 and an imaging signal line driver circuit 303s_2 that reads out imaging signals.

<Cross-Sectional View>

The touch panel 300 includes a substrate 310 and a counter substrate 370 that faces the substrate 310 (see FIG. 9B).

By using a flexible material as the substrate 310 and the counter substrate 370, the touch panel 300 can have flexibility.

Note that when the flexible touch panel 300 is changed in its form, stress is applied to a function element provided in the touch panel 300. A function element is preferably positioned in the center between the substrate 310 and the counter substrate 370 because a change in form of the function element can be prevented.

Furthermore, the substrate 310 is preferably formed using a material whose coefficient of linear expansion is substantially equal to that of the counter substrate 370. For example, the coefficient of linear expansion of the materials are preferably lower than or equal to $1 \times 10^{-3}$/K, more preferably lower than or equal to $5 \times 10^{-5}$/K, and still more preferably lower than or equal to $1 \times 10^{-5}$/K.

For example, materials that contain polyester, polyolefin, polyamide (e.g., nylon or aramid), polyimide, polycarbonate, or a resin having an acrylic bond, a urethane bond, an epoxy bond, or a siloxane bond can be used for the substrate 310 and the counter substrate 370.

The substrate 310 is a stack including a substrate 310b having flexibility, a barrier film 310a that prevents diffusion of impurities to the light-emitting elements, and a resin layer 310c that attaches the barrier film 310a to the substrate 310b. Note that the substrate 310 transmits a visible light with a transmittance greater than or equal to 50%.

The counter substrate 370 is a stack including a substrate 370b having flexibility, a barrier film 370a that prevents diffusion of impurities to the light-emitting elements, and a resin layer 370c that attaches the barrier film 370a to the substrate 370b (see FIG. 9B).

A sealant 360 attaches the counter substrate 370 to the substrate 310. In addition, since the sealant 360 has a higher refractive index than air, optical bonding (a bonding technique by which reflection at interfaces can be suppressed) can be achieved. The pixel circuits and the light-emitting elements (e.g., a first light-emitting element 350R) are provided between the substrate 310 and the counter substrate 370.

<<Pixel Structure>>

Each of the pixels 302 includes a sub-pixel 302R, a sub-pixel 302G, and a sub-pixel 302B (see FIG. 9C). The sub-pixel 302R includes a light-emitting module 380R, the sub-pixel 302G includes a light-emitting module 380G, and the sub-pixel 302B includes a light-emitting module 380B.

For example, the sub-pixel 302R includes the first light-emitting element 350R and the pixel circuit that can supply electric power to the first light-emitting element 350R and includes a transistor 302t (see FIG. 9B). Furthermore, the light-emitting module 380R includes the first light-emitting element 350R and an optical element (e.g., a first coloring layer 367R).

The first light-emitting element 350R includes a lower electrode 351R, an upper electrode 352, and a layer 353 containing a light-emitting organic compound between the lower electrode 351R and the upper electrode 352 (see FIG. 9C).

The layer 353 containing a light-emitting organic compound includes a light-emitting unit 353a, a light-emitting unit 353b, and an intermediate layer 354 between the light-emitting units 353a and 353b.

The light-emitting module 380R includes the first coloring layer 367R on the counter substrate 370. The coloring layer transmits light with a particular wavelength and is, for example, a layer that selectively transmits red, green, or blue light. Alternatively, a region that transmits light emitted from the light-emitting element as it is may be provided.

The light-emitting module 380R, for example, includes the sealant 360 that is in contact with the first light-emitting element 350R and the first coloring layer 367R.

The first coloring layer 367R is positioned in a region overlapping with the first light-emitting element 350R. Accordingly, part of light emitted from the first light-emitting element 350R passes through the sealant 360 and the first coloring layer 367R and is emitted to the outside of the light-emitting module 380R as indicated by arrows in FIGS. 9B and 9C. Emitting direction of light is not limited to one direction and may be both directions. In that case, the coloring layer may be provided on the substrate 310.

<<Structure of Display Panel>>

The touch panel 300 includes a light-blocking layer 367BM on the counter substrate 370. The light-blocking layer 367BM is provided so as to surround the coloring layer (e.g., the first coloring layer 367R). The light-blocking layer 367BM is preferably not provided in order to increase the light transmitting property of the display portion.

The touch panel 300 includes an anti-reflective layer 367p positioned in a region overlapping with the display portion 301. As the anti-reflective layer 367p, a circular polarizing plate can be used, for example.

The touch panel 300 includes an insulating film 321. The insulating film 321 covers the transistor 302t. Note that the insulating film 321 can be used as a layer for planarizing unevenness caused by the pixel circuits. An insulating film on which a layer that can prevent diffusion of impurities to the transistor 302t and the like is stacked can be used as the insulating film 321.

The touch panel 300 includes the light-emitting elements (e.g., the first light-emitting element 350R) over the insulating film 321.

The touch panel 300 includes, over the insulating film 321, a partition wall 328 that overlaps with an end portion of the lower electrode 351R (see FIG. 9C). In addition, a spacer 329 that controls the distance between the substrate 310 and the counter substrate 370 is provided on the partition wall 328.

<<Structure of Image Signal Line Driver Circuit>>

The image signal line driver circuit 303s_1 includes a transistor 303t and a capacitor 303c. Note that the driver circuit can be formed in the same process and over the same substrate as those of the pixel circuits.

<<Structure of Imaging Pixel>>

The imaging pixels 308 each include a photoelectric conversion element 308p and an imaging pixel circuit for sensing light received by the photoelectric conversion element 308p. The imaging pixel circuit includes a transistor 308t.

For example, a PIN photodiode can be used as the photoelectric conversion element 308p.

<<Other Components>>

The touch panel 300 includes a wiring 311 through which a signal can be supplied. The wiring 311 is provided with a terminal 319. Note that the flexible printed circuit 309_1 through which a signal such as an image signal or a synchronization signal is supplied is electrically connected to the terminal 319.

Note that a printed wiring board (PWB) may be attached to the flexible printed circuit 309_1.

Transistors formed in the same process can be used as the transistor 302t, the transistor 303t, the transistor 308t, and the like.

Transistors of a bottom-gate type, a top-gate type, or the like can be used.

Any of various kinds of semiconductors can be used in the transistors. For example, an oxide semiconductor, single crystal silicon, polysilicon, amorphous silicon, or the like can be used.

This embodiment can be combined with any of the other embodiments in this specification as appropriate.

Embodiment 6

In this embodiment, a structure of a foldable touch panel that can be used in a data processing device will be described with reference to FIGS. 10A and 10B, and FIGS. 11A, 11B, and 11C.

Figure 10A:
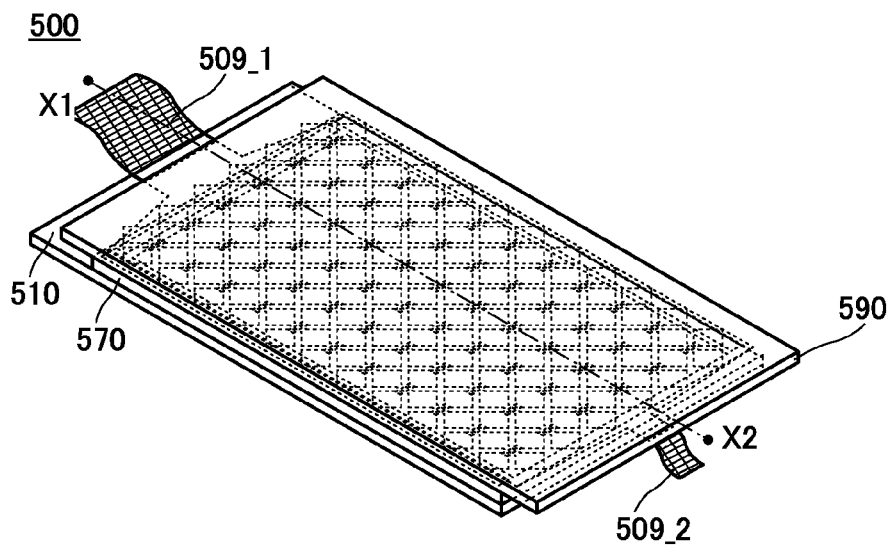
FIGS. 10A and 10B illustrate structure examples of a touch panel that can be used in a data processing device.
Figure 10B:
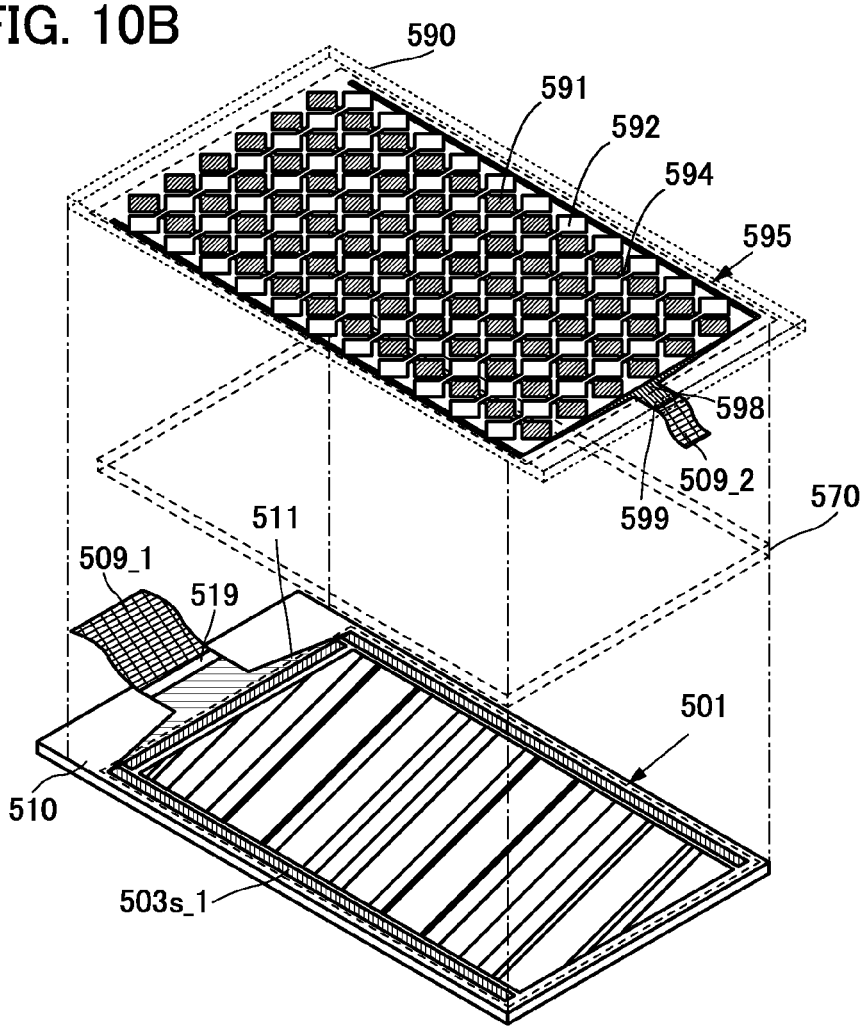

FIG. 10A is a perspective view of a touch panel 500 described in this embodiment. Note that FIGS. 10A and 10B illustrate only main components for simplicity. FIG. 10B is a perspective view of the touch panel 500.

Figure 11A:
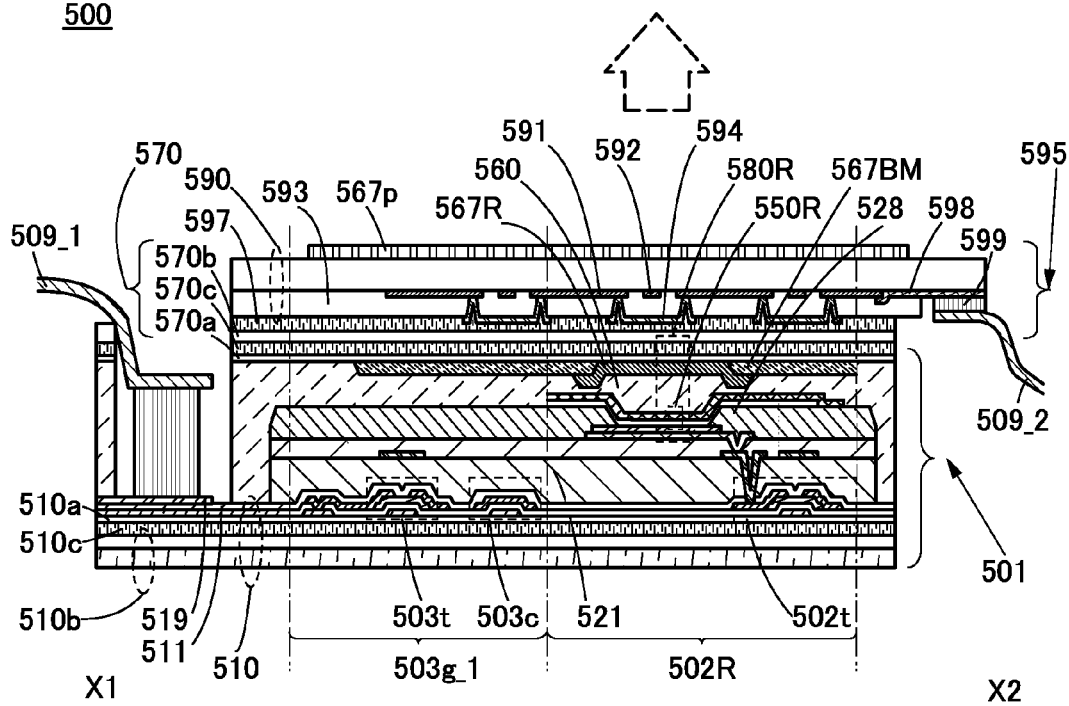
FIGS. 11A to 11C illustrate structure examples of a touch panel that can be used in a data processing device.

FIG. 11A is a cross-sectional view of the touch panel 500 taken along line X1-X2 in FIG. 10A.

The touch panel 500 includes a display portion 501 and a touch sensor 595 (see FIG. 10B). Furthermore, the touch panel 500 includes a substrate 510, a substrate 570, and a substrate 590. Note that the substrate 510, the substrate 570, and the substrate 590 each have flexibility.

The display portion 501 includes the substrate 510, a plurality of pixels over the substrate 510, and a plurality of wirings 511 through which signals are supplied to the pixels. The plurality of wirings 511 is led to a peripheral portion of the substrate 510, and part of the plurality of wirings 511 forms a terminal 519. The terminal 519 is electrically connected to a flexible printed circuit 509_1.

<Touch Sensor>

The substrate 590 includes the touch sensor 595 and a plurality of wirings 598 electrically connected to the touch sensor 595. The plurality of wirings 598 is led to a peripheral portion of the substrate 590, and part of the plurality of wirings 598 forms a terminal. The terminal is electrically connected to a flexible printed circuit 509_2. Note that in FIG. 10B, electrodes, wirings, and the like of the touch sensor 595 provided on the back side of the substrate 590 are indicated by solid lines for clarity.

As the touch sensor 595, a capacitive touch sensor can be used. Examples of the capacitive touch sensor are a surface capacitive touch sensor and a projected capacitive touch sensor.

Examples of the projected capacitive touch sensor are a self capacitive touch sensor and a mutual capacitive touch sensor, which differ mainly in the driving method. The use of a mutual capacitive type is preferable because multiple points can be sensed simultaneously.

The case of using a projected capacitive touch sensor will be described below with reference to FIG. 10B.

Note that a variety of sensors that can sense the closeness or the contact of a sensing target such as a finger, can be used.

The projected capacitive touch sensor 595 includes electrodes 591 and electrodes 592. The electrodes 591 are electrically connected to any of the plurality of wirings 598, and the electrodes 592 are electrically connected to any of the other wirings 598.

The electrodes 592 each have a shape of a plurality of quadrangles arranged in one direction with one corner of a quadrangle connected to one corner of another quadrangle as illustrated in FIGS. 10A and 10B.

The electrodes 591 each have a quadrangular shape and are arranged in a direction intersecting with the direction in which the electrodes 592 extend.

A wiring 594 electrically connects two electrodes 591 between which the electrode 592 is positioned. The intersecting area of the electrode 592 and the wiring 594 is preferably as small as possible. Such a structure allows a reduction in the area of a region where the electrodes are not provided, reducing unevenness in transmittance. As a result, unevenness in luminance of light from the touch sensor 595 can be reduced.

Note that the shapes of the electrodes 591 and the electrodes 592 are not limited to the above-mentioned shapes and can be any of a variety of shapes. For example, the plurality of electrodes 591 may be provided so that space between the electrodes 591 are reduced as much as possible, and a plurality of electrodes 592 may be provided with an insulating layer sandwiched between the electrodes 591 and the electrodes 592 and may be spaced apart from each other to form a region not overlapping with the electrodes 591. In that case, between two adjacent electrodes 592, it is preferable to provide a dummy electrode which is electrically insulated from these electrodes, whereby the area of a region having a different transmittance can be reduced.

The structure of the touch sensor 595 is described with reference to FIG. 11A.

The touch sensor 595 includes the electrodes 591 and the electrodes 592 provided in a staggered arrangement on the substrate 590, an insulating layer 593 covering the electrodes 591 and the electrodes 592, and the wiring 594 that electrically connects the adjacent electrodes 591 to each other.

A resin layer 597 attaches the substrate 590 to the substrate 570 so that the touch sensor 595 overlaps with the display portion 501.

The electrodes 591 and the electrodes 592 are formed using a light-transmitting conductive material. As a light-transmitting conductive material, a conductive oxide such as indium oxide, indium tin oxide, indium zinc oxide, zinc oxide, or zinc oxide to which gallium is added can be used. Note that a film including graphene may be used as well. The film including graphene can be formed, for example, by reducing a film containing graphene oxide. As a reducing method, a method with application of heat or the like can be employed.

The electrodes 591 and the electrodes 592 may be formed by depositing a light-transmitting conductive material on the substrate 590 by a sputtering method and then removing an unnecessary portion by any of various patterning techniques such as photolithography.

Examples of a material for the insulating layer 593 include resins such as an acrylic resin and an epoxy resin, a resin having a siloxane bond, and inorganic insulating materials such as silicon oxide, silicon oxynitride, and aluminum oxide.

Furthermore, openings reaching the electrodes 591 are formed in the insulating layer 593, and the wiring 594 electrically connects the adjacent electrodes 591. A light-transmitting conductive material can be favorably used as the wiring 594 because the aperture ratio of the touch panel can be increased. Moreover, a material with higher conductivity than the conductivities of the electrodes 591 and 592 can be favorably used because electric resistance can be reduced.

One electrode 592 extends in one direction, and a plurality of electrodes 592 is provided in the form of stripes.

The wiring 594 intersects with the electrode 592.

Adjacent electrodes 591 are provided with one electrode 592 provided therebetween. The wiring 594 electrically connects the adjacent electrodes 591.

Note that the plurality of electrodes 591 is not necessarily arranged in the direction orthogonal to one electrode 592 and may be arranged to intersect with one electrode 592 at an angle of less than 90 degrees.

One wiring 598 is electrically connected to any of the electrodes 591 and 592. Part of the wiring 598 serves as a terminal. For the wiring 598, a metal material such as aluminum, gold, platinum, silver, nickel, titanium, tungsten, chromium, molybdenum, iron, cobalt, copper, or palladium or an alloy material containing any of these metal materials can be used.

Note that an insulating layer that covers the insulating layer 593 and the wiring 594 may be provided to protect the touch sensor 595.

Furthermore, a connection layer 599 electrically connects the wiring 598 to the flexible printed circuit 509_2.

As the connection layer 599, any of various anisotropic conductive films (ACF), anisotropic conductive pastes (ACP), or the like can be used.

The resin layer 597 has a light-transmitting property. For example, a thermosetting resin or an ultraviolet curable resin can be used; specifically, a resin such as an acrylic resin, a urethane resin, an epoxy resin, or a resin having a siloxane bond can be used.

<Display Portion>

The display portion 501 includes a plurality of pixels arranged in a matrix. Each of the pixels includes a display element and a pixel circuit for driving the display element.

In this embodiment, an example of using an organic electroluminescent element that emits white light as a display element will be described; however, the display element is not limited to such element.

For example, organic electroluminescent elements that emit light of different colors may be included in sub-pixels so that the light of different colors can be emitted from the respective sub-pixels.

Any of various kinds of display elements such as an organic electroluminescent element, a display element can be used as the display element.

In the display portion, an active matrix method in which an active element is included in a pixel or a passive matrix method in which an active element is not included in a pixel can be used.

In an active matrix method, as an active element (a non-linear element), not only a transistor but also various active elements (non-linear elements) can be used. For example, an MIM (metal insulator metal), a TFD (thin film diode), or the like can also be used. Since such an element has a small number of manufacturing steps, manufacturing cost can be reduced or yield can be improved. Alternatively, since the size of the element is small, the aperture ratio can be improved, so that power consumption can be reduced or higher luminance can be achieved.

As a method other than the active matrix method, the passive matrix method in which an active element (a non-linear element) is not used can also be used. Since an active element (a non-linear element) is not used, the number of manufacturing steps is small, so that manufacturing cost can be reduced or yield can be improved. Alternatively, since an active element (a non-linear element) is not used, the aperture ratio can be improved, so that power consumption can be reduced or higher luminance can be achieved, for example.

Flexible materials can be favorably used in the substrate 510 and the substrate 570.

Materials with which passage of impurities is inhibited can be favorably used in the substrate 510 and the substrate 570. For example, materials with a vapor permeability of lower than or equal to $10^{-5}$ g/m²·day, preferably lower than or equal to $10^{-6}$ g/m²·day can be favorably used.

The substrate 510 can be favorably formed using a material whose coefficient of linear expansion is substantially equal to that of the substrate 570. For example, the coefficient of linear expansion of the materials are preferably lower than or equal to $1\times10^{-3}$/K, further preferably lower than or equal to $5\times10^{-5}$/K, and still further preferably lower than or equal to $1\times10^{-5}$/K.

The substrate 510 is a stack in which a flexible substrate 510b, a barrier film 510a that prevents diffusion of impurities to light-emitting elements, and a resin layer 510c that attaches the barrier film 510a to the substrate 510b are stacked.

For example, materials that include polyester, polyolefin, polyamide (e.g., nylon, aramid), polyimide, polycarbonate, or a resin having an acrylic bond, a urethane bond, an epoxy bond, or a siloxane bond can be used for the resin layer 510c.

The substrate 570 is a stack in which a flexible substrate 570b, a barrier film 570a that prevents diffusion of impurities to the light-emitting elements, and a resin layer 570c that attaches the barrier film 570a to the substrate 570b are stacked.

A sealant 560 attaches the substrate 570 to the substrate 510. The sealant 560 has a refractive index higher than that of air. In the case where light is extracted to the sealant 560 side, optical bonding is achieved by the sealant 560. The pixel circuits and the light-emitting elements (e.g., a first light-emitting element 550R) are provided between the substrate 510 and the substrate 570.

<<Pixel Structure>>

A pixel includes a sub-pixel 502R, and the sub-pixel 502R includes a light-emitting module 580R.

The sub-pixel 502R includes the first light-emitting element 550R and the pixel circuit that can supply electric power to the first light-emitting element 550R and includes a transistor 502t. Furthermore, the light-emitting module 580R includes the first light-emitting element 550R and an optical element (e.g., a coloring layer 567R).

The first light-emitting element 550R includes a lower electrode, an upper electrode, and a layer containing a light-emitting organic compound between the lower electrode and the upper electrode.

The light-emitting module 580R includes the first coloring layer 567R on the light extraction side. The coloring layer transmits light of a particular wavelength and is, for example, a layer that selectively transmits light of red, green, or blue color. Note that in another sub-pixel, a region that transmits light emitted from the light-emitting element as it is may be provided as well.

In the case where the sealant 560 is provided on the light extraction side, the sealant 560 is in contact with the first light-emitting element 550R and the first coloring layer 567R.

The first coloring layer 567R is positioned in a region overlapping with the first light-emitting element 550R. Accordingly, part of light emitted from the light-emitting element 550R passes through the first coloring layer 567R and is emitted to the outside of the light-emitting module 580R as indicated by an arrow in FIG. 11A.

<<Structure of Display Portion>>

The display portion 501 includes a light-blocking layer 567BM on the light emitting side. The light-blocking layer 567BM is provided so as to surround the coloring layer (e.g., the first coloring layer 567R). Note that the light-blocking layer 567BM is preferably not provided in order to improve the light transmitting property of the display portion.

The display portion 501 includes an anti-reflective layer 567p positioned in a region overlapping with pixels. As the anti-reflective layer 567p, a circular polarizing plate can be used, for example.

The display portion 501 includes an insulating film 521. The insulating film 521 covers the transistor 502t. Note that the insulating film 521 can be used as a layer for planarizing unevenness due to the pixel circuit. A stacked film including a layer that can prevent diffusion of impurities can be used as the insulating film 521. This can prevent the reliability of the transistor 502t or the like from being lowered by diffusion of unintentional impurities.

The display portion 501 includes the light-emitting elements (e.g., the first light-emitting element 550R) over the insulating film 521.

The display portion 501 includes, over the insulating film 521, a partition wall 528 that overlaps with an end portion of the lower electrode. In addition, a spacer that controls the distance between the substrate 510 and the substrate 570 is provided on the partition wall 528.

<<Structural Example of Scan Line Driver Circuit>>

A scan line driver circuit 503g_1 includes a transistor 503t and a capacitor 503c. Note that the driver circuit can be formed in the same process and over the same substrate as those of the pixel circuits.

<<Other Components>>

The display portion 501 includes the wirings 511 through which signals can be supplied. The wirings 511 are provided with the terminal 519. Note that the flexible printed circuit 509_1 through which a signal such as an image signal or a synchronization signal are supplied is electrically connected to the terminal 519.

Note that a printed wiring board (PWB) may be attached to the flexible printed circuit 509_1.

The display portion 501 includes wirings such as scan lines, signal lines, and power supply lines. Any of various conductive films can be used as the wirings.

Specifically, a metal element selected from aluminum, chromium, copper, tantalum, titanium, molybdenum, tungsten, nickel, yttrium, zirconium, silver, and manganese; an alloy including any of the above-described metal elements; an alloy including any of the above-described metal elements in combination; or the like can be used. In particular, one or more elements selected from aluminum, chromium, copper, tantalum, titanium, molybdenum, and tungsten are preferably included. In particular, an alloy of copper and manganese is suitably used in microfabrication with the use of a wet etching method.

Specifically, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, or the like can be used.

Specifically, a layered film in which a film that contains an element selected from titanium, tantalum, tungsten, molybdenum, chromium, neodymium, and scandium is stacked over an aluminum-containing film may be used. Alternatively, a layered film in which a film that contains more than one elements selected from titanium, tantalum, tungsten, molybdenum, chromium, neodymium, and scandium is stacked over an aluminum-containing film can be used. In addition, a layered film in which a nitride film containing an element selected from titanium, tantalum, tungsten, molybdenum, chromium, neodymium, and scandium is stacked over an aluminum-containing film may be used.

Alternatively, a light-transmitting conductive material including indium oxide, tin oxide, or zinc oxide may be used.

Modification Example 1 of Display Portion

Any of various kinds of transistors can be used in the display portion 501.

Figure 11B:
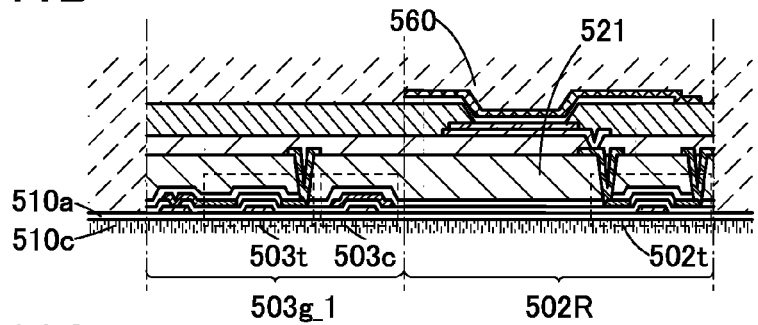

A structure in the case of using bottom-gate transistors in the display portion 501 is illustrated in FIGS. 11A and 11B.

For example, a semiconductor layer containing an oxide semiconductor, amorphous silicon, or the like can be used in the transistor 502t and the transistor 503t illustrated in FIG. 11A.

For example, a film represented by an In-M-Zn oxide that contains at least indium (In), zinc (Zn), and M (M is a metal such as Al, Ga, Ge, Y, Zr, Sn, La, Ce, or Hf) is preferably included. Alternatively, both In and Zn are preferably contained.

As a stabilizer, gallium (Ga), tin (Sn), hafnium (Hf), aluminum (Al), zirconium (Zr), and the like can be given. As another stabilizer, lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) can be given.

As an oxide semiconductor included in an oxide semiconductor film, any of the followings can be used, for example: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, an In—Hf—Al—Zn-based oxide, and an In—Ga-based oxide.

Note that here, for example, an "In—Ga—Zn-based oxide" means an oxide containing In, Ga, and Zn as its main components and there is no limitation on the ratio of In:Ga:Zn. The In—Ga—Zn-based oxide may contain another metal element in addition to In, Ga, and Zn.

For example, a semiconductor layer containing polycrystalline silicon that is obtained by crystallization process such as laser annealing can be used in the transistor 502t and the transistor 503t shown in FIG. 11B.

Figure 11C:
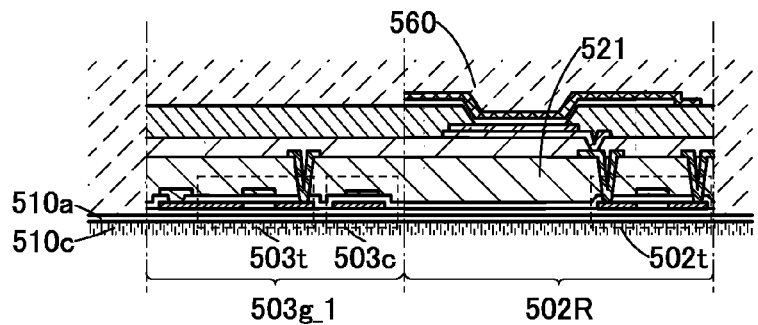

A structure of the case of using top-gate transistors in the display portion 501 is illustrated in FIG. 11C.

For example, a semiconductor layer containing polycrystalline silicon, a single crystal silicon film that is transferred from a single crystal silicon substrate, or the like can be used in the transistor 502t and the transistor 503t illustrated in FIG. 11C.

This embodiment can be combined with any of the other embodiments in this specification as appropriate.

Embodiment 7

In this embodiment, a structure of a foldable touch panel that can be used in a data processing device will be described with reference to FIGS. 12A to 12C.

Figure 12A:
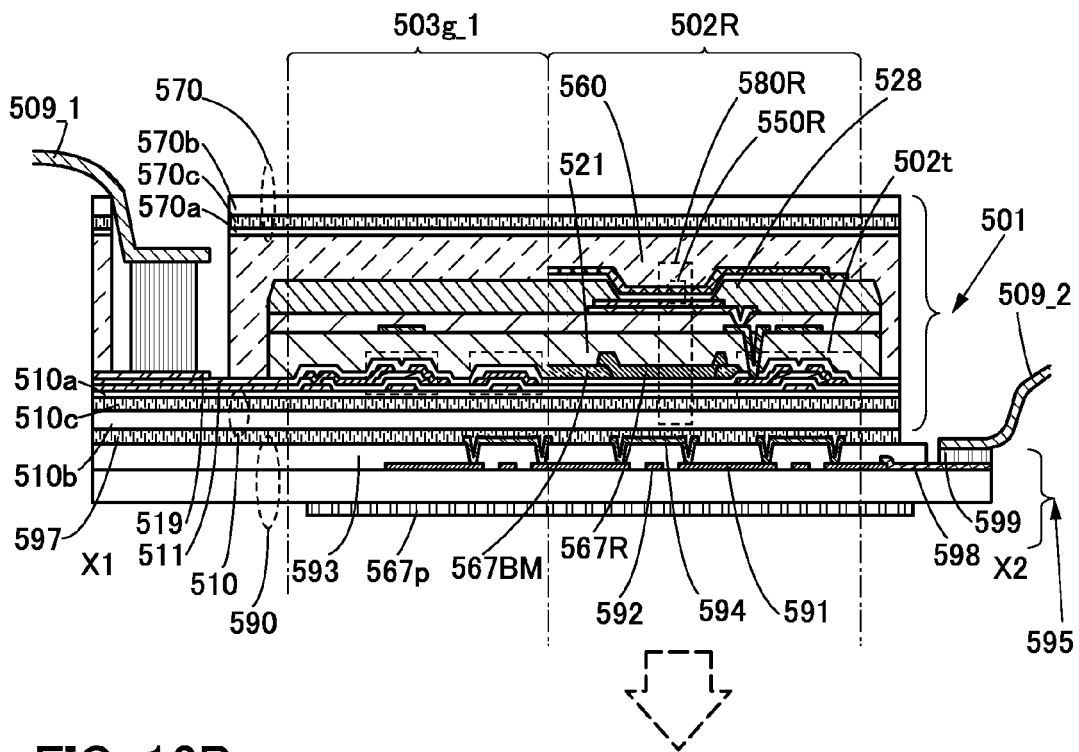
FIGS. 12A to 12C illustrate structure examples of a touch panel that can be used in a data processing device.
Figure 12B:
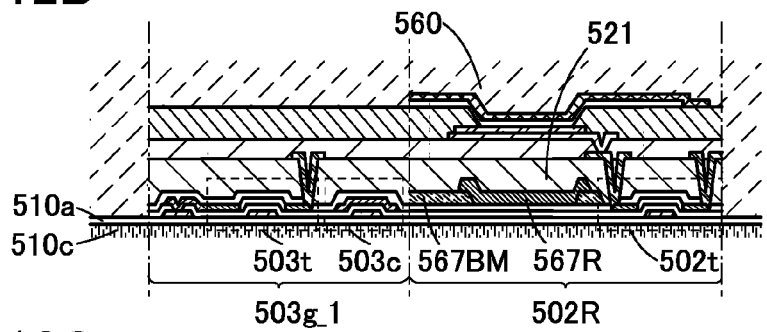
Figure 12C:
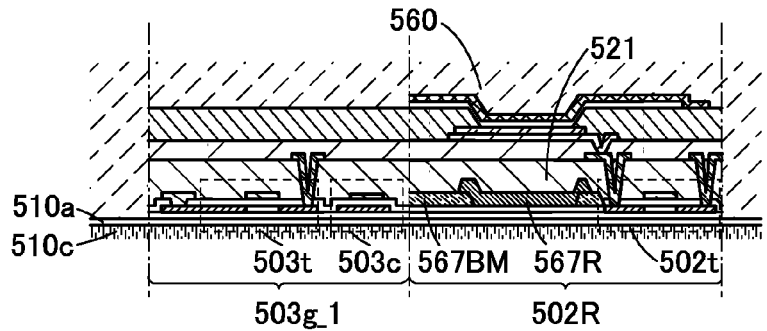

FIGS. 12A to 12C are cross-sectional views illustrating a touch panel 500B.

The touch panel 500B described in this embodiment is different from the touch panel 500 described in Embodiment 6 in that the display portion 501 performs display on the side where the transistors are provided and that the touch sensor is provided on the substrate 510 side of the display portion, based on a received image data. Different structures will be described in detail below, and the above description is referred to for the other similar structures.

<Display Portion>

The display portion 501 includes a plurality of pixels arranged in a matrix. Each of the pixels includes a display element and a pixel circuit for driving the display element.

<<Pixel Structure>>

A pixel includes the sub-pixel 502R, and the sub-pixel 502R includes a light-emitting module 580R.

The sub-pixel 502R includes the first light-emitting element 550R and the pixel circuit that can supply electric power to the first light-emitting element 550R and includes a transistor 502t.

Furthermore, the light-emitting module 580R includes the first light-emitting element 550R and an optical element (e.g., the coloring layer 567R).

The first light-emitting element 550R includes a lower electrode, an upper electrode, and a layer containing a light-emitting organic compound between the lower electrode and the upper electrode.

The light-emitting module 580R includes the first coloring layer 567R on the light extraction side. The coloring layer transmits light of a particular wavelength and is, for example, a layer that selectively transmits light of red, green, or blue color. Note that in another sub-pixel, a region that transmits light emitted from the light-emitting element as it is may be provided as well.

The first coloring layer 567R is positioned in a region overlapping with the first light-emitting element 550R. The first light-emitting element 550R shown in FIG. 12A emits light to the side where the transistor 502t is provided. Accordingly, part of light emitted from the first light-emitting element 550R passes through the first coloring layer 567R and is emitted to the outside of the light-emitting module 580R as indicated by an arrow in FIG. 12A. Emitting direction of light is not limited to one direction and may be both directions.

<<Structure of Display Portion>>

The display portion 501 includes a light-blocking layer 567BM on the light emitting side. The light-blocking layer 567BM is provided so as to surround the coloring layer (e.g., the first coloring layer 567R). Note that the light-blocking layer 567BM is preferably not provided in order to improve the light transmitting property of the display portion.

The display portion 501 includes the insulating film 521. The insulating film 521 covers the transistor 502t. Note that the insulating film 521 can be used as a layer for planarizing unevenness due to the pixel circuit. A stacked film including a layer that can prevent diffusion of impurities can be used as the insulating film 521. This can prevent the decrease of the reliability of the transistor 502t or the like due to diffusion of impurities from the coloring layer 567R.

<Touch Sensor>

The touch sensor 595 is provided on the substrate 510 side of the display portion 501 (see FIG. 12A).

The resin layer 597 is provided between the substrate 510 and the substrate 590 and attaches the touch sensor 595 to the display portion 501.

Modification Example 1 of Display Portion

Any of various kinds of transistors can be used in the display portion 501.

A structure in which bottom-gate transistors are used in the display portion 501 is illustrated in FIGS. 12A and 12B.

For example, a semiconductor layer containing an oxide semiconductor, amorphous silicon, or the like can be used in the transistor 502t and the transistor 503t shown in FIG. 12A. In the transistors, a channel formation region may be sandwiched between upper and lower gate electrodes, in which case variations in characteristics of the transistors can be prevented and thus the reliability can be increased.

For example, a semiconductor layer containing polycrystalline silicon or the like can be used in the transistor 502t and the transistor 503t shown in FIG. 12B.

A structure in which top-gate transistors are used in the display portion 501 is shown in FIG. 12C.

For example, a semiconductor layer including polycrystalline silicon, a transferred single crystal silicon film, or the like can be used in the transistor 502t and the transistor 503t shown in FIG. 12C.

This embodiment can be combined with any of the other embodiments in this specification as appropriate.

Embodiment 8

In this embodiment, the structures of data processing devices will be described with reference to FIG. 13 and FIGS. 14A and 14B.

Figure 13:
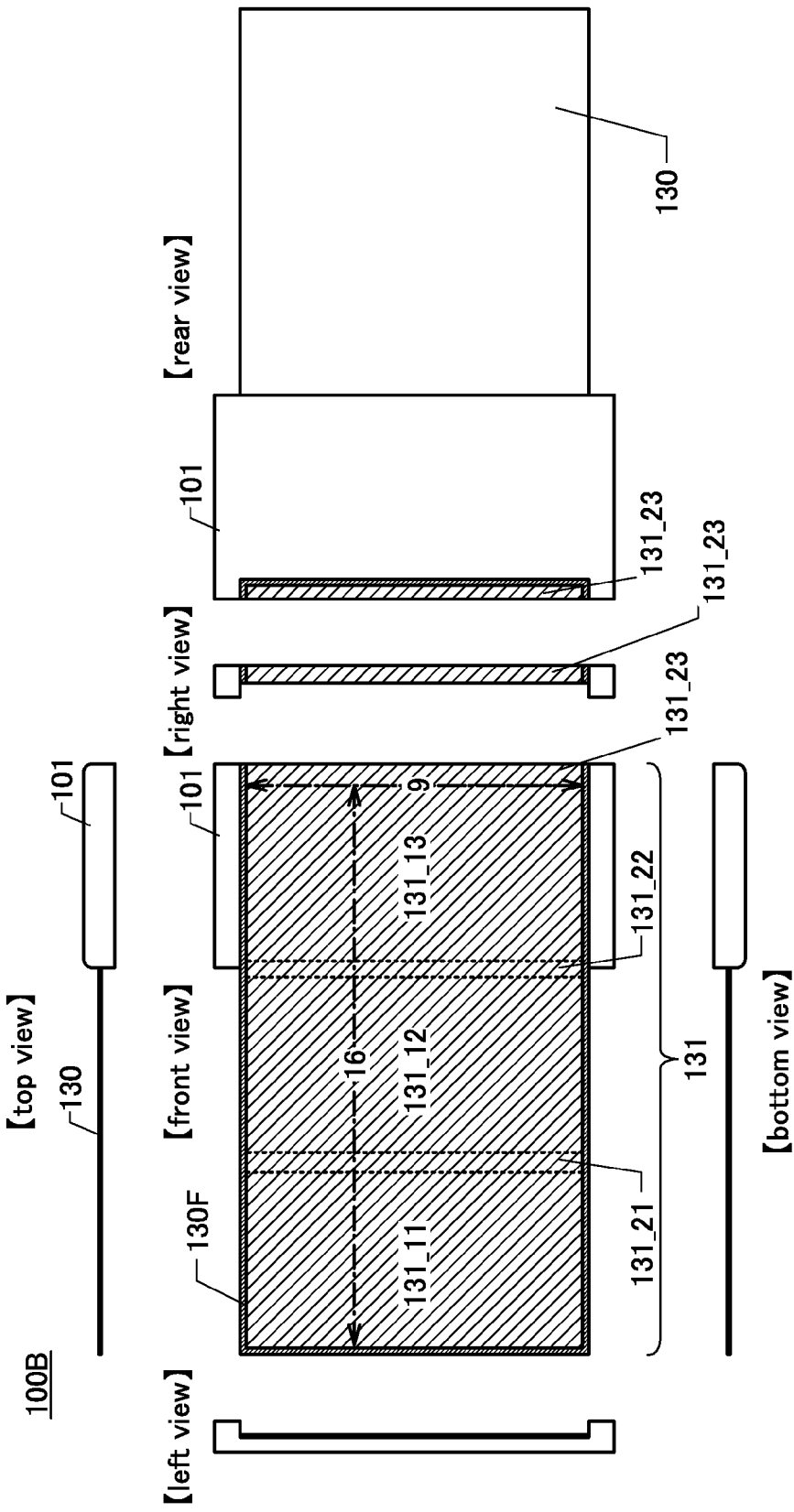
FIG. 13 is an example of a hexahedral view illustrating a data processing device.

FIG. 13 is a hexahedral view illustrating an unfolded display portion of the data processing device.

FIGS. 14A and 14B illustrate a folded display portion of the data processing device. FIG. 14A is a hexahedral view, and FIG. 14B is a cross-sectional view along A-A'.

<Example of Structure of Data Processing Device>

A data processing device 100B includes the display portion 130 where the first region 131_11, the first bendable region 131_21, the second region 131_12, the second bendable region 131_22, the third region 131_13, and a third bendable region 131_23 are arranged in stripes in this order. The display portion 130 can be folded and unfolded along a first fold line formed in the first bendable region 131_21 and a second fold line formed in the second bendable region 131_22 (see FIG. 13 and FIGS. 14A and 14B).

The ratio of the length of a short side of the first region 131_11 to the length of a long side thereof is 0.9 times or more and 1.1 times or less the ratio of the length of a short side of the display region 131 to the length of a long side thereof. The ratio of the length of the short side of the first region to the length of the long side thereof is approximately 9:16.

The data processing device 100B described in this embodiment includes the display portion 130 where the first region 131_11, the first bendable region 131_21, and the second region 131_12 are arranged in this order. The display portion 130 can be folded along the first bendable region 131_21 such that the ratio of the length of the short side of the first region 131_11 to the length of the long side thereof (9/16) is 0.9 times or more and 1.1 times or less the ratio of the length of the short side of the display region 131 to the length of the long side thereof (9/16).

With such a structure, an image having approximately the same ratio of the vertical length to the horizontal length as an image displayed on the first region 131_11 of the display region 131 in a folded state can be displayed on the display region 131 in an unfolded state. Thus, the novel display panel can be highly convenient or reliable.

The data processing device 100B further includes the arithmetic device 110, the battery 110B, and the housing 101 (see FIG. 14B). The arithmetic device 110 is supplied with a power supply potential and supplies image data. The battery 110B supplies a power supply potential. The arithmetic device 110 and the battery 110B are provided in the housing 101.

The display portion 130 is supplied with image data and a power supply potential and performs display based on the image data.

The third bendable region 131_23 is provided so as to be bendable along a side surface of the housing 101, and display can be performed on a side surface and a back surface of the data processing device 100B (see FIG. 14A).

The display portion 130 may have a frame 130F outside the display region 131. The frame 130F is not necessarily provided with a display element and may be supplied with a blank image signal.

A touch sensor can be provided so as to overlap with the display portion 130. The display portion with which the touch sensor overlaps can be called a touch panel.

The touch panel can supply positional data, and the arithmetic device is supplied with the positional data.

This embodiment can be combined with any of the other embodiments in this specification as appropriate.

This application is based on Japanese Patent Application serial no. 2014-048381 filed with the Japan Patent Office on Mar. 12, 2014, the entire contents of which are hereby incorporated by reference.

What is claimed is:

1. A data processing device comprising:
   an input-output processor which is supplied with first image data and supplies first sensing data; and
   an arithmetic processor which supplies the first image data and is supplied with the first sensing data,
   wherein the input-output processor includes a display portion which is supplied with the first image data and a sensor portion which supplies the first sensing data,
   wherein the display portion includes a display region in which a first region, a first bendable region, a second region, a second bendable region, and a third region are arranged in this order formed over a substrate,
   wherein in the first region, the first bendable region, the second region, the second bendable region, and the third region, the data processing device is configured to transmit light from a surface of the data processing device to an opposite surface of the data processing device,
   wherein the display portion is capable of being folded and unfolded along a first fold line formed in the first bendable region and a second fold line formed in the second bendable region,
   wherein the sensor portion determines whether the display portion is folded or unfolded and supplies second sensing data which contains data showing the determined state,
   wherein the arithmetic processor is configured to supply second image data in a case where the second sensing data contains data that shows a folded state,
   wherein the second image data is image data by which a first image as large as to fit the first region is displayed,
   wherein the arithmetic processor is configured to supply third image data in a case where the second sensing data contains data that shows an unfolded state,
   wherein the third image data is image data by which a second image that is approximately similar to the first image and fits the display region is displayed,
   wherein the arithmetic processor includes an arithmetic portion and a storage portion which stores a program to be executed by the arithmetic portion,
   wherein the program includes the steps of:
      a first step of acquiring initial data containing status data;
      a second step of allowing an interrupt processing;
      a third step of acquiring predetermined data;
      a fourth step of selecting a fifth step when the status data shows a first status or a sixth step when the status data shows a second status;
      the fifth step of generating the second image data on the basis of the data acquired in the third step and displaying the first image based on the second image data;
      the sixth step of generating the third image data on the basis of the data acquired in the third step and displaying the second image based on the third image data;
      a seventh step of selecting an eighth step when a termination instruction is supplied in the interrupt processing or the third step when no termination instruction is supplied in the interrupt processing; and
      the eighth step of terminating the program, and
   wherein the interrupt processing includes:
      a ninth step of acquiring the second sensing data containing data which shows the folded or unfolded state of the display portion;
      a tenth step of determining candidate data on the basis of the second sensing data;
      an eleventh step of selecting the ninth step when the candidate data differs from the status data or a twelfth step when the candidate data is the same as the status data;
      the twelfth step of updating the status data to the candidate data; and
      a thirteenth step of returning from the interrupt processing.

2. A data processing device comprising:
   an input-output processor which is supplied with first image data and supplies sensing data; and
   an arithmetic processor which supplies the first image data and is supplied with the sensing data,
   wherein the input-output processor includes a display portion which is supplied with the first image data, and a sensor portion which supplies the sensing data,
   wherein the display portion includes a display region in which a first region, a first bendable region, and a second region are arranged in this order formed over a substrate,
   wherein in the first region, the first bendable region, and the second region, the data processing device is configured to transmit light from a surface of the data processing device to an opposite surface of the data processing device,
   wherein the display portion is capable of being folded and unfolded along a first fold line formed in the first bendable region,
   wherein the sensor portion determines whether the display portion is folded or unfolded and supplies second sensing data that contains data showing the determined state,
   wherein the arithmetic processor supplies second image data in a case where the second sensing data contains data that shows a folded state,
   wherein the second image data is image data by which a first image as large as to fit the first region is displayed,
   wherein the arithmetic processor supplies third image data in a case where the second sensing data contains data that shows an unfolded state,
   wherein the third image data is image data by which a second image that is approximately similar to the first image and fits the display region is displayed,
   wherein the arithmetic processor includes an arithmetic portion and a storage portion which stores a program to be executed by the arithmetic portion, wherein the program includes the steps of:
a first step of acquiring initial data containing status data;
a second step of allowing an interrupt processing;
a third step of acquiring predetermined data;
a fourth step of selecting a fifth step when the status data shows a first status or a sixth step when the status data shows a second status;
the fifth step of generating the second image data on the basis of the data acquired in the third step and displaying the first image based on the second image data;
the sixth step of generating the third image data on the basis of the data acquired in the third step and displaying the second image based on the third image data;
a seventh step of selecting an eighth step when a termination instruction is supplied in the interrupt processing or the third step when no termination instruction is supplied in the interrupt processing; and
the eighth step of terminating the program, and
wherein the interrupt processing includes:
a ninth step of acquiring the second sensing data containing data which shows the folded or unfolded state of the display portion;
a tenth step of determining candidate data on the basis of the second sensing data;
an eleventh step of selecting the ninth step when the candidate data differs from the status data or a twelfth step when the candidate data is the same as the status data;
the twelfth step of updating the status data to the candidate data; and
a thirteenth step of returning from the interrupt processing.

3. The data processing device according to claim 2, wherein the second image is larger than the first image.

4. The data processing device according to claim 2,
wherein one of a vertical length and a horizontal length of the first image is 0.9 times or more the length of a short side or a long side of the first region, and
wherein one of a vertical length and a horizontal length of the second image is 0.9 times or more the length of a short side or a long side of the display region.

5. The data processing device according to claim 2,
wherein, by one of the second image data and the third image data, a third image is displayed outside a region where the first image or the second image is displayed.

6. The data processing device according to claim 2,
wherein the sensor portion determines a position of the display portion and supplies third sensing data containing data which shows the determined position, and
wherein the arithmetic processor determines a direction of the first image or the second image on the basis of the third sensing data and generates image data by which the first image or the second image located in the determined direction is displayed.

7. The data processing device according to claim 2,
wherein a ratio of the length of the short side of the first region to the length of the long side thereof is 0.9 times or more and 1.1 times or less a ratio of the length of the short side of the display region to the length of the long side thereof, and
wherein the ratio of the length of the short side of the first region to the length of the long side thereof is approximately 9:16.

8. The data processing device according to claim 3,
wherein one of a vertical length and a horizontal length of the first image is 0.9 times or more the length of a short side or a long side of the first region, and
wherein one of a vertical length and a horizontal length of the second image is 0.9 times or more the length of a short side or a long side of the display region.

9. The data processing device according to claim 8,
wherein, by one of the second image data and the third image data, a third image is displayed outside a region where the first image or the second image is displayed.

10. The data processing device according to claim 9,
wherein the sensor portion determines a position of the display portion and supplies third sensing data containing data which shows the determined position, and
wherein the arithmetic processor determines a direction of the first image or the second image on the basis of the third sensing data and generates image data by which the first image or the second image located in the determined direction is displayed.

* * * * *